US008885941B2

(12) United States Patent
Schiller et al.

(10) Patent No.: US 8,885,941 B2
(45) Date of Patent: Nov. 11, 2014

(54) SYSTEM AND METHOD FOR ESTIMATING SPATIALLY VARYING DEFOCUS BLUR IN A DIGITAL IMAGE

(75) Inventors: Stephen N. Schiller, Oakland, CA (US); Scott D. Cohen, Sunnyvale, CA (US); Xiang Zhu, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 221 days.

(21) Appl. No.: 13/562,618

(22) Filed: Jul. 31, 2012

(65) Prior Publication Data

US 2013/0071028 A1 Mar. 21, 2013

Related U.S. Application Data

(60) Provisional application No. 61/535,822, filed on Sep. 16, 2011.

(51) Int. Cl.

| | |
|---|---|
| ***G06K 9/34*** | (2006.01) |
| ***G06K 9/62*** | (2006.01) |
| ***G06K 9/40*** | (2006.01) |
| ***G06T 5/00*** | (2006.01) |
| ***G06T 7/00*** | (2006.01) |

(52) U.S. Cl.

CPC ............... *G06T 5/003* (2013.01); *G06T 7/0081* (2013.01); *G06T 2207/10024* (2013.01); *G06T 2207/20076* (2013.01); *G06T 2207/20064* (2013.01)

USPC ............................ 382/180; 382/228; 382/264

(58) Field of Classification Search

CPC ....... G06K 9/34; G06K 9/342; G06K 9/4638; G06T 5/001; G06T 5/20; G06T 5/004; G06T 7/0081; G06T 5/002; G06T 5/003

USPC .......................................... 382/180, 228, 264

See application file for complete search history.

(56) References Cited

U.S. PATENT DOCUMENTS

| | | | | |
|---|---|---|---|---|
| 8,208,746 | B2 * | 6/2012 | Albu et al. | 382/255 |
| 8,503,801 | B2 * | 8/2013 | Schiller et al. | 382/228 |
| 2006/0115174 | A1 | 6/2006 | Lim et al. | |

(Continued)

OTHER PUBLICATIONS

V.P. Namboodiri, S. Chaudhuri, and S. Hadap, "Regularized Depth From Defocus", in Proceedings of International Conference on Image Processing (ICIP), San Diego, CA, USA, 2008. pp. 1520-1523.

(Continued)

*Primary Examiner* — Kanjibhai Patel

(74) *Attorney, Agent, or Firm* — Wolfe-SBMC

(57) ABSTRACT

An image editing application (or a blur classification module thereof) may automatically estimate a coherent defocus blur map from a single input image. The application may represent the blur spectrum as a differentiable function of radius r, and the optimal radius may be estimated by optimizing the likelihood function through a gradient descent algorithm. The application may generate the spectrum function over r through polynomial-based fitting. After fitting, the application may generate look-up tables to store values for the spectrum and for its first and second order derivatives, respectively. The use of these tables in the likelihood optimization process may significantly reduce the computational costs of a given blur estimation exercise. The application may minimize an energy function that includes a data term, a smoothness term, and a smoothness parameter that is adaptive to local image content. The output blur map may be used for image object depth estimation.

19 Claims, 18 Drawing Sheets

(56) References Cited

U.S. PATENT DOCUMENTS

| | | | |
|---|---|---|---|
| 2009/0316995 | A1 | 12/2009 | Szeliski et al. |
| 2010/0086232 | A1 | 4/2010 | Sun et al. |
| 2010/0123807 | A1 | 5/2010 | Lee et al. |
| 2010/0246939 | A1 | 9/2010 | Aisaka et al. |
| 2010/0272356 | A1 | 10/2010 | Hong |

OTHER PUBLICATIONS

Ayan Chakrabarti, Todd Zickler, William T. Freeman, "Analyzing Spatially-varying Blur", in Proceedings of IEEE Conference on Computer Vision and Pattern Recognition (CVPR). San Francisco, CA. Jun. 3-18, 2010. pp. 2512-2519.

U.S. Appl. No. 12/956,996, filed Nov. 30, 2010, Stephen N Schiller.

* cited by examiner

FIG. 15A — simulated input image 1500

FIG. 15B — actual blur map 1510, blur map legend 1515

FIG. 15C — preliminary blur map 1520

FIG. 15D — final output blur map 1530, blur map legend 1535

SYSTEM AND METHOD FOR ESTIMATING SPATIALLY VARYING DEFOCUS BLUR IN A DIGITAL IMAGE

PRIORITY INFORMATION

This application claims benefit of priority of U.S. Provisional Application Ser. No. 61/535,822 entitled "System and Method for Estimating Lens Blur in a Digital Image" filed Sep. 16, 2011, the content of which is incorporated by reference herein in its entirety.

BACKGROUND

Description of the Related Art

It is common in a digital photo for the subject of interest to be in focus and for the remaining background, or possibly foreground, to be more or less out of focus. An artist or photo editor will often want to edit the subject of interest in a photo, or the background, separately from the rest of the image. For example, the artist may want to obscure, darken, or lighten the background. Conversely, the artist may want to enhance the contrast or lighting only in the subject of interest.

A digital imaging system has a limited depth of field, which leads to defocus blur. Defocus blur is spatially changing, and can typically be locally described though a simple model (e.g. disc, Gaussian) characterized by a single parameter indicating its spread (radius, standard deviation, etc.). A 2D map indicating the value of such a spread parameter for every pixel is called a defocus blur map. In such maps, the values indicate the level of local blur at each pixel.

It is also often desirable to estimate the distance of objects in a digital photo from the camera. This allows one, for example, to reconstruct a 3D scene from a photograph. This information is typically referred to as "depth" information. The computation of depth information usually requires two photos of the same scene, typically taken at the same time but from slightly different vantage points (i.e., a stereo pair). However, the degree of defocus blur in a photo can sometimes be correlated with the distance of points in the photo from the camera, especially if one knows the focus setting and aperture setting for the lens that took the picture. Defocus blur estimates can be useful either alone or in conjunction with a stereo pair to estimate depth information for a photo.

One previously proposed method of estimating the amount of defocus blur in an image uses the technique of "inverse diffusion". One problem with this approach is that blur is assumed to arise from a Gaussian blur kernel, which is not an accurate model of the physical process involved. Also, in observed results, the content of the image tends to unduly affect the blur estimate. For example, shadows are often given a different blur estimate than adjacent non-shaded regions, and even smooth backgrounds may not have a single uniform blur estimate.

Another proposed method estimates blur based on the power spectrum of local windows into the image. However, this method is limited to one-dimensional (1D) blur kernels. It also uses a sharp edged window, which makes it impossible to distinguish the sharp edge of the window from sharp edges in the image. In addition, the segmentation generated with this method can only distinguish between part of the image blurred with one blur kernel and those parts of the image that are not blurred with this one kernel. For example, it operates on the assumption that a single, "most likely" blur kernel blurs some parts of the image and not others.

SUMMARY

Various embodiments of systems and methods for automatically estimating a coherent defocus blur map from a single input image are described herein. In some embodiments, a blur classification module may be configured to compute the probability that a given pixel in a digital image was blurred using a given two-dimensional blur kernel, and to store the computed probability in a blur classification probability matrix. The blur classification probability matrix may store multiple values for each pixel, each indicating the probability that a particular pixel in the digital image was blurred using a different two-dimensional blur kernel (e.g., a disc kernel having a particular radius). In other words, the blur classification module may be configured to compute a blur classification probability value for all combinations of the pixels of the digital image and the blur kernels in a set of two or more blur kernels when performing a blur classification exercise. In some embodiments, the blur classification module may represent the blur spectrum as a differentiable function of radius r, and the optimal radius may be estimated by optimizing the likelihood function through a gradient descent algorithm.

In some embodiments, computing the probability values may include computing a frequency power spectrum for pixels of the digital image in multiple windows into the digital image and/or computing a frequency power spectrum for each of the blur kernels in a set of likely blur kernels. In some embodiments, the blur classification module may generate the spectrum function over r through polynomial-based fitting. After fitting, the blur classification module may generate three look-up tables, in which it may store values for the spectrum and for its first and second order derivatives, respectively. The use of these tables in the likelihood optimization process may significantly reduce the computational costs of a given blur estimation exercise.

In some embodiments, a blur classification module may be configured to generate a preliminary mapping between each pixel of the digital image and a respective one of a set of possible blur states indicating the degree of blur at the pixel dependent, at least in part, on the values stored in a blur classification probability matrix. In some embodiments, the blur classification module may generate a final estimated output blur map by minimizing an energy function that includes a data term, a smoothness term, a smoothness parameter that is adaptive to local image content, and a confidence map that weights the data term according to the local confidence in the preliminary estimate. Generating the final estimated output blur mapping may include solving a labeling problem using an alpha expansion technique. In some embodiments, a blur classification module may be configured to perform a binary segmentation of a digital image into blurry and sharp regions dependent, at least in part, on the values stored in a blur classification probability matrix. Performing the binary segmentation may be further dependent on one or more of: the colors of the pixels in the digital image, the difference between the colors of two or more neighboring pixels in the digital image, or feedback indicating an incorrect labeling of one or more pixels of the digital image in the binary segmentation In some embodiments, a blur classification module may be configured to access data representing a digital image, and to pre-process that image data prior as part of a blur classification exercise. For example, the blur classification module may be configured to produce modified image data by performing one or more of: generating horizontal and vertical gradients of the digital image, converting the image data to a floating point format, reversing a correction induced by the format of the image data, or converting the image data to a grayscale format. In such embodiments, some or all of the subsequent operations performed as part of the blur classification exercise (e.g., computing the frequency power spectrum in various image windows) may be performed on this modified image data, rather than on the input image data. In some embodiments, computing the frequency power spectrum may be dependent on one or more of: a selected filter basis, a window size parameter value, or a noise level parameter value, and the final labeling of the pixels may be dependent on a pixel coherence (or smoothness) parameter value.

In some embodiments, the results of one of the blur classification exercises described herein (e.g., a coherent blur mapping and/or a binary image segmentation) may be employed in a subsequent image editing operation in an image editing application. For example, in some embodiments, a user may be able to specify that a given editing operation (e.g., a change in lighting, color, contrast, or other image characteristics, or a cropping, scaling, or other type of image editing operation) be directed to the "subject" of a digital image, or to the "background" in a digital image. In such embodiments, the image editing application may be configured to perform the operation on portions of the image for which the blur state has a particular value (e.g., "blurry" or "sharp"), or a value within a particular range of values, without the user needing to explicitly identify a "subject" or "background" portion of the image. In some embodiments, the values stored in a blur classification probability matrix or resulting from a coherent blur mapping may be employed in an operation to estimate the depth of one or more elements in a digital image.

Figure 1:
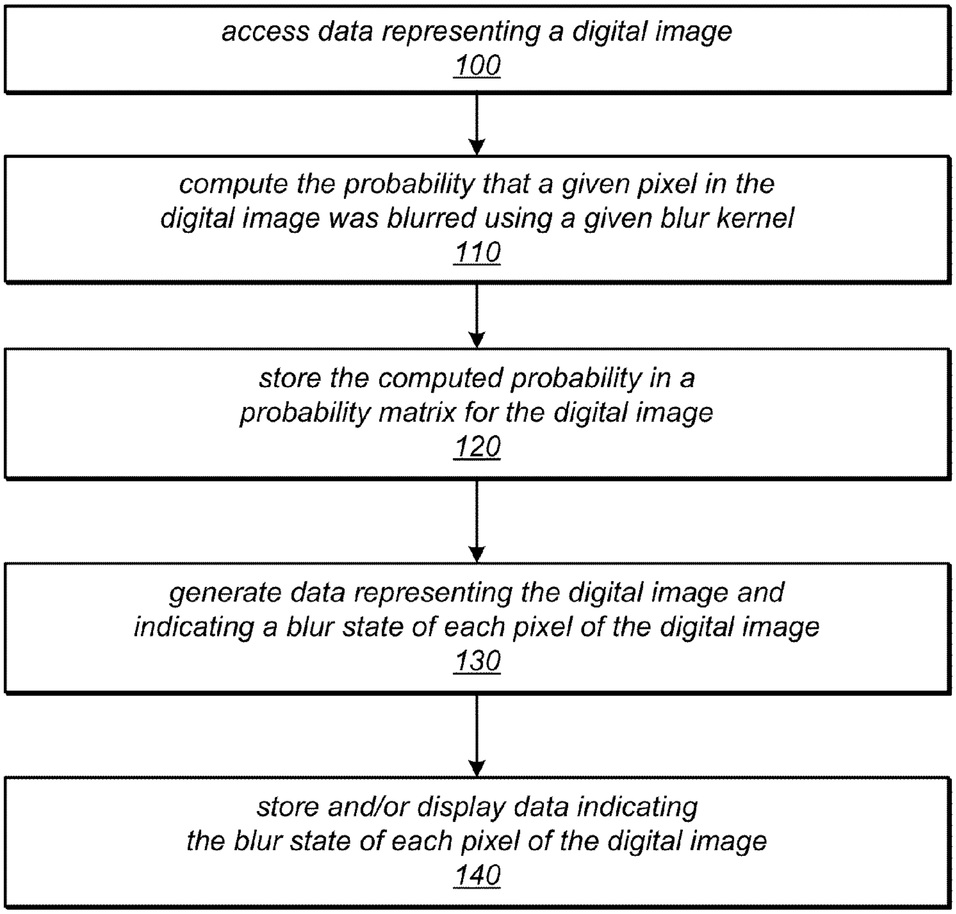
FIG. 1 is a flow diagram illustrating a method for classifying the blur state of pixels in a digital image, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of systems and methods for classifying the blur state of pixels in a digital image with little or no user intervention are described herein. For example, the blur classification techniques may be used to segment a digital image into sharp and blurry (i.e., out-of-focus) regions. In some embodiments, the systems described herein may provide an automatic or semi-automatic way of selecting those pixels in a digital image corresponding to the sharp areas of an image. It is understood that the complement of this group of pixels (i.e., the blurry, or out-of-focus pixels) may be readily selectable once the former have been identified. In some embodiments, the blur classification techniques described herein may be used to produce a coherent mapping of the pixels in a digital image to more than two blur states, indicating that different portions of the digital image are blurred by different amounts and/or by different blur functions.

In some embodiments, the methods described herein may be used to estimate the amount of blur present at any location in a digital image in order to identify portions of the image on which to operate. For example, a user may wish to adjust color, light, contrast, or other parameters only in the portion of the image that depicts the subject of the image or only in the background portions of the image. In other embodiments, the methods described herein may be used to estimate the amount of blur present at any location in a digital image as an aid to depth estimation. The degree of blur at a given pixel may in some embodiments be represented as an integer or floating point number (e.g., a value ranging from 0 to about 20), which indicates the radius, in pixels, of the blur disc most likely to have blurred the image at a given point. As used in the examples described herein, the formal definition of a sharp image $I_{sharp}$ being blurred by a disc of radius N is that in the corresponding blurry image, $I_{blurry}$, a pixel at location P in $I_{blurry}$ is the average (or a weighted average) of all the pixels whose distance from P in $I_{sharp}$ is less than or equal to N. In other words, a blur kernel may, for each pixel, compute the average of the pixels in its neighborhood, according to a particular weighting that is applied to its neighbors. Different blur kernels may apply different weighting schemes. For example, with a motion blur kernel, only the pixels to the right and left of the central pixel may be considered, or they may be weighted more heavily than other pixels in the neighborhood of the central pixel.

In some embodiments, the systems described herein may extend a scheme for estimating blur based on the power spectrum of local windows into the image such that the method handles any 2D blur kernels. In particular, the methods described herein may handle blur kernels corresponding to camera lens blur (i.e., disc kernels). For example, such blur kernels may represent the smearing of the image by moving the camera lens horizontally or vertically. The methods described herein may use a Gaussian window, rather than a sharp edged window, to process the digital image, making it possible to distinguish the sharp edge of the window from sharp edges in the image itself. In various embodiments, these windows may have any one of a variety of shapes, or different windows may be of different shapes. The methods described herein may also be more flexible than previous techniques in that they may be able to distinguish between areas of the image that are blurred with multiple (but different) blur kernels. In some embodiments, the method may use a radial basis function to save time.

As described in more detail below, the first half of a method for classifying the blur state of the pixels in a digital image may assign a set of probabilities to each location (e.g., pixel) in an image, each corresponding to the likelihood that the given point was blurred with one of the blur kernels in a set of blur kernels. This data may be referred to herein as a "blur classification probability matrix". This information may then be used to produce a blur map (i.e., a map of the amount of blur at each pixel) and/or a segmentation of the image into sharp and blurry regions, in various embodiments.

An accurate defocus blur map (sometimes referred to herein merely as a "blur map") may have multiple potential applications. As previously noted, a blur map may be employed to detect and segment in-focus subjects in an image from an out-of-focus background, which may assist a photo editor or artist in editing only the subject of interest (which is typically in focus) or only the background, e.g., in separate image editing operations.

As previously noted, the defocus levels in an image may be closely related to the depth of the scene. Therefore, in some embodiments, a blur map may provide important information to a depth estimation operation. For example, the computation of depth information typically requires two photos of the same scene taken at the same time but from slightly different vantage points (i.e., a stereo pair). However, in many (if not most) practical cases only one image is available. In some embodiments, a blur map may facilitate the reconstruction of a 3D scene from a single photograph as long as the focus setting and the aperture setting of the camera are known. In some embodiments, even without these camera settings, a blur map may roughly depict the 3D geometric information of the scene (e.g., the depth of various elements in the scene).

The techniques described herein may in some embodiments provide an automatic or semi-automatic way of estimating a defocus blur map from a single input image. If the blur map is sufficiently accurate to indicate the exact amount of blur present at any location in a digital image, it may also be employed in performing spatially variant de-blurring, e.g., "correcting" the blur and making all parts of the image in-focus. In some embodiments, this may significantly improve the image quality and/or the performance of imaging systems. For example, if defocus blur is no longer a big problem for imaging (because it can be accurately corrected), a larger aperture size may be allowed, which may also reduce the noise level.

A method for classifying the blur state of pixels in a digital image is illustrated by the flow diagram in FIG. 1, according to one embodiment. In various embodiments, the operations illustrated in FIG. 1 may be implemented in software, in hardware, or in a combination of hardware and software. For example, in some embodiments, they may be performed by one or more modules of an image editing application that provides a blur classification feature or by one or more standalone software modules configured to perform these operations. As illustrated at 100, in this example, the method may include accessing data representing a digital image. For example, data representing an input image may be obtained from data storage in response to user input selecting an existing image for editing. In some embodiments, a picture may be taken with a digital camera, or an image that already exists on film or paper may be scanned in to produce a digital image. The digital image may be uploaded to a computer where it may be accessed for editing.

As shown at 110, the method illustrated in FIG. 1 may include computing the likelihood that a given pixel in the digital image was blurred using a given blur kernel (e.g., a 2D blur kernel), which may include computing a frequency power spectrum for various image windows and the blur kernels, as described in more detail below. In other embodiments, the method may employ other approaches to computing the likelihood (e.g., a wavelet-based computation). As shown in 120, the results of this computation may be stored as a probability value in a blur classification probability matrix, which is sometimes referred to herein as L for likelihood. In this example, L may store the probability that a given pixel P in the image was blurred by a given kernel B(j), and may store other values, each indicating the probability that a particular pixel was blurred using a particular two-dimensional blur kernel. In other words, L may store probability values indicating the likelihoods of all combinations of pixels and blur kernels. Thus the array L may be indexed by both the pixel position P and the kernel index j.

As described in more detail herein, the values stored in a blur classification probability matrix may be subsequently used to generate data representing the digital image and indicating a blur state of each pixel of the digital image, as in 130. For example, these probability values may be used to generate a binary segmentation of the digital image into sharp and blurry regions, or a coherent blur mapping between image pixels and more than two blur states, as described in more detail. As illustrated in FIG. 1, the method may include storing and/or displaying data indicating the blur state of each pixel of the digital image, as in 140. For example, the method may include storing a mapping of pixels to blur states in an array indexed by pixel location, or displaying a binary image mask indicating the segmentation of the digital image into sharp and blurry regions, in various embodiments.

Figure 2:
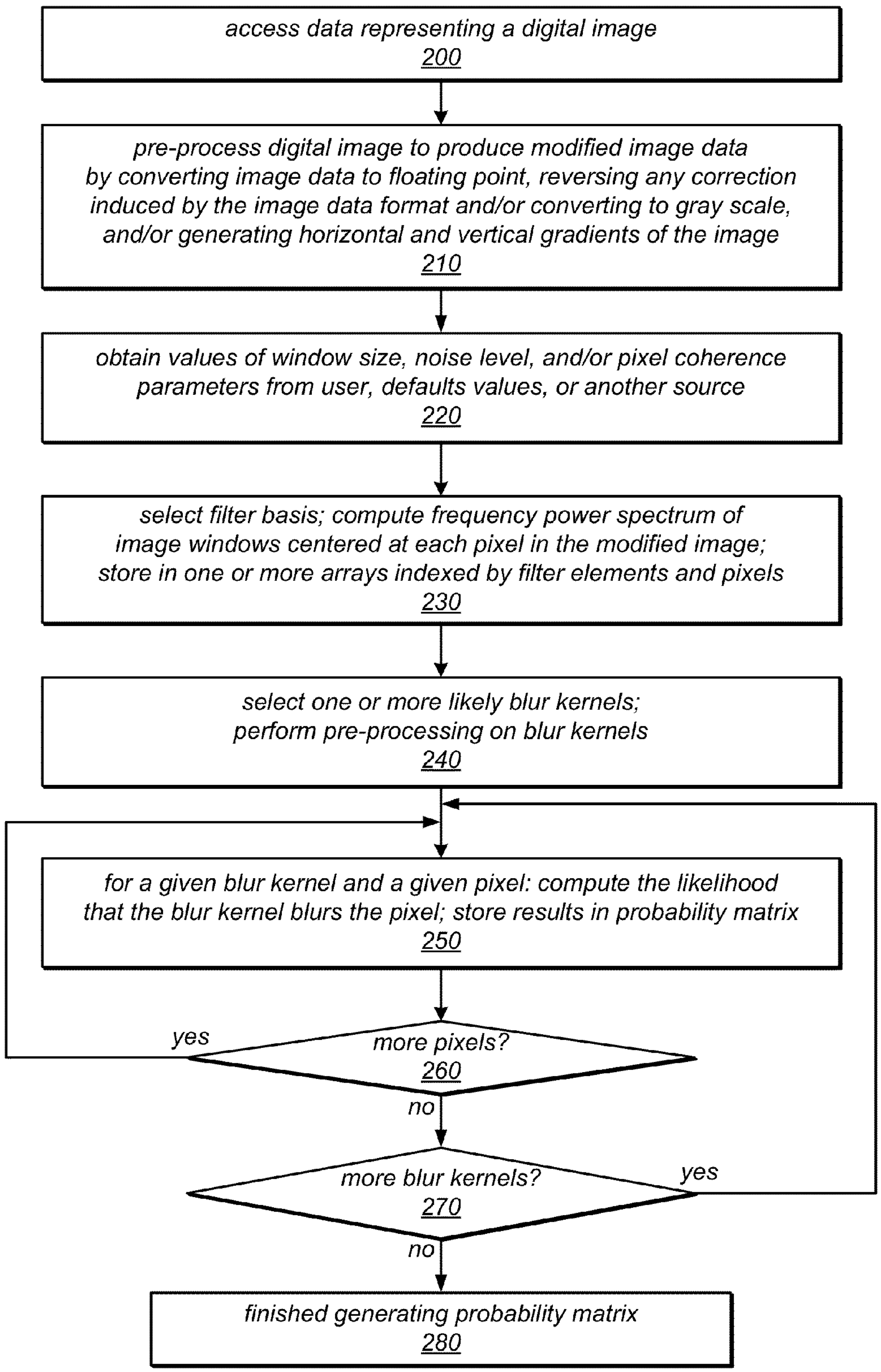
FIG. 2 is a flow diagram illustrating a method for generating a probability matrix whose values represent the likelihood that particular pixels of a digital image were blurred using particular blur kernels, according to some embodiments.

FIG. 2 is a flow diagram illustrating a method for generating a probability matrix whose values represent the likelihood that particular pixels of a digital image were blurred using particular blur kernels, according to some embodiments. In various embodiments, the operations illustrated in FIG. 2 may be implemented in software, in hardware, or in a combination of hardware and software. For example, in some embodiments, they may be performed by one or more modules of an image editing application or by one or more standalone software modules configured to perform them. As illustrated at 200, in this example, the method may include accessing data representing a digital image. For example, data representing an input image may be obtained from data storage in response to user input selecting an existing image for editing. In some embodiments, a picture may be taken with a digital camera, or an image that already exists on film or paper may be scanned in to produce a digital image. The digital image may be uploaded to a computer where it may be accessed for editing.

As illustrated at 210, the method may include pre-processing the input digital image (as needed) to produce modified image data. In various embodiments, this pre-processing may include converting the image data to floating point data, reversing any color correction induced by the image data format, which may include converting the image data to gray scale (as necessary), and/or generating horizontal and vertical gradients of the image (as described below) to produce modified image data. For example, various types of digital images may be stored on the computer as 2D arrays of 8-bit or 16-bit integers. Such integer formats may be linearly scaled to floating point values such that the maximum possible 8-bit or 16-bit integer is mapped to a floating point 1 and the integer 0 is mapped to a floating point 0. For some types of image formats, such as JPEG, gamma correction that has been applied to each image channel may be reversed, e.g., by raising each floating-point value to the power 2.2. This may return the lighting value in the image to one better representing the lighting that was sensed by the camera, for example. In some embodiments, a gray scale version of the image may be produced by this computation (which may be referred to as "converting to a linear color space") if the image has two or more color channels. For example, if a digital image is stored in the RGB format, the standard weighted average of the red, green, blue channels may be taken to obtain a gray scale image. In other embodiments, converting to a linear color space may include converting image data in sRGB color space to XYZ color space, and using the luminance channel of the XYZ space (i.e., the X channel) to effectively convert the image data to grayscale. In the detailed description that follows, the term "image" may refer to this modified gray scale image, unless some version of an original color input image is explicitly referenced.

Note that in some embodiments, the methods described herein may be improved by considering the red, green and blur channels of color image separately up to and including the point of computing the blur classification probability matrix. In such embodiments, the probability matrices for each channel may be combined when determining a classification result for a given pixel. This may in some cases yield a more accurate result, as one or more of the color channels may contribute more useful information than that contributed by a single gray scale channel. However, this approach may be more time consuming than an approach that operates on a gray scale image.

As illustrated at 220, the method for generating a blur classification probability matrix may include selecting and/or otherwise obtaining the values of one or more parameters to be used in subsequent computations in a blur classification exercise. In various embodiments, these parameters may include window size, noise level, and/or pixel coherence. These values may be entered by a user through a GUI of the image editing application, may be selected by the user from a set of available values, may be default values provided by the system, and/or may be obtained from a configuration file or another source, in different embodiments.

In the example illustrated in FIG. 2, the "window size" parameter may represent the diameter of a square sub-window into the image. For a given pixel P, a window of this size is centered at P and all pixels inside this window are used to compute the blur at the pixel P. There are various tradeoffs to be made in selecting the window size, in different embodiments. For example, if the window size is too large, the window may more often overlap areas that are both blurred and not blurred, and thus may more often give ambiguous results. However, if the window size is too small, there may not be enough data to accurately estimate the blur. Thus, the estimates may be erratic and may be influenced by the content of the image more than by the blur of the image. In various embodiments, the method may typically use a window size that is three to four times the diameter of the largest blur that expected to be encountered. In some embodiments, the window size may be selected such that, at a minimum, it is larger than the largest blur kernel in the set.

In the example illustrated in FIG. 2, the "noise level" parameter (or Z) for the image may represent an estimate of the amount of signal corruption in the image data after the blur occurred. This may typically be a result of a combination of camera sensor noise and the effects of the quantization of analog levels to integer levels in the digital image representation. For example, it may be at least partially the result of an analog-to-digital conversion operation or the result of variations in lighting across the image captured by a camera. In some embodiments, values for the noise level parameter may be expressed as additive random values from normal distribution with standard deviation, Z, in the range from 1E-3 to 1E-5.

In the example illustrated in FIG. 2, the "pixel coherence" or "smoothness" parameter (or $\lambda$) may control how closely the blur amount assigned to a pixel P depends on the blur amount assigned to its neighbors. For example, if this value is high, the blur classification process may attempt to make the blur amounts continuous, at the cost of ignoring small variations in any initial estimates from one pixel to the next. On the other hand, if this value is low, the blur classification process may attempt to follow any initial blur estimates more closely, at the expense of producing a potentially noisy and/or jagged output. The pixel coherence parameter and the effect of its value are described in more detail below.

Information about blur may in some embodiments be analyzed by means of a frequency power spectrum. As illustrated at 230, the method for generating a blur classification probability matrix shown in FIG. 2 may include computing the frequency power spectrum of image windows centered at each pixel in the (modified, gray scale) image. As illustrated in this example, the first step in computing the frequency power spectrum may be to select a "filter basis". This filter basis may include a set of functions (sometimes referred to herein as "filter elements") defined over the same spatial extent as the window. Each such function may represent a different spatial frequency, or a group of related spatial frequencies. Again, the filter basis may be selected or entered by a user, or may be a default value provided by the system, in different embodiments. This filter basis may be used in computing the frequency power spectrum of image windows centered at each pixel in the modified image, and the results of this computation may be stored in one or more arrays indexed by the filter elements and the locations of the pixels at which each image window is centered.

The frequency power spectrum reflects how much different spatial frequencies contribute to information in an image, or in this example, the portion of an image inside a square window centered at a given pixel. In the description below, the terms "window" or "image window" may refer to the sub-image of the image taken from a square window of diameter "window size" pixels, centered around some pixel P=(x,y) in the image. Note that in some embodiments, if the window centered at P goes outside the boundary of the image, those pixels outside the boundary of the image may be set to zero in the window. In other embodiments, other methods of filling in these out of bounds values may be used. For example, values of the image may be reflected into the out of bounds portion of the window.

In some embodiments, the method for generating a blur classification probability matrix may include selecting one or more likely blur kernels (e.g., a blur kernel set) to be used in the blur classification exercise, as in 240. As illustrated in this example, the method may include performing a pre-processing operation on those blur kernels to compute the frequency power spectrum of each. This information may then be stored for use in subsequent computations.

As shown in FIG. 2, the method for generating a blur classification probability matrix may include, for each blur kernel and each pixel, computing the likelihood that the blur kernel blurs the pixel. This is illustrated in FIG. 2 at element 250, and by the feedback from 260 to 250 and the feedback from 270 to 250. In other words, the method may include iterating over all pixels in the digital image and over all blur kernels in the selected blur kernel set until the likelihoods for all combinations of pixels and blur kernels have been computed and stored. Once all of these likelihoods have been computed, shown as the negative exit from 270, the generation of the blur classification probability matrix may be complete, as in 280. As previously noted, the blur classification probability matrix may in some embodiments be stored as an array L that is indexed by both the pixel position P and the kernel index j. As described in more detail herein, this blur classification probability matrix may be subsequently used to compute coherent blur maps and/or binary segmentations of the image.

A spatial frequency is a complex wave function that oscillates in a particular direction and with a definite period. It is complex in that the real and imaginary parts are sinusoids of equal magnitude and 90 degrees out of phase. This is called a pure sinusoid and is the simplest spatial (i.e., 2D) filter function. The frequency of such a pure sinusoid may be specified by a vector $(f_x, f_y)$, which gives both the direction and the period of the sinusoid. The exact formula as a function of spatial position (x,y) is as follows:

$$F(x,y)=\exp((xf_x+yf_y)2\pi i)$$

Another variation on a filter element is a product of a pure sinusoid with a 2D Gaussian function. In some embodiments, the system described herein may use a 2D Gaussian window that is centered in the image window and whose standard deviation is about ¼ of the diameter of the window size. This may have the advantage of tapering values down to zero as they approach the edges of the window. Otherwise, the edge of the window may appear to be a sharp edge in the image and may mask the true power spectrum frequency response.

In one embodiment, the filter basis may consist of pure sinusoids whose corresponding frequency vectors, $(f_x, f_y)$, are equally spaced in the frequency domain and are equal in number to the area of the image window. In some embodiments, if a Gaussian window is used, the number of pure sinusoids may be approximately equal to the volume under the Gaussian window, i.e., the sum of the Gaussian window elements. In such embodiments, the highest frequency element may have a period of about four pixels, and the zero-frequency, or constant sinusoid, may not be used.

In still other embodiments, the methods described herein may combine all of the pure sinusoids with the same spatial frequency into one filter element. The resulting function may look like a radial wave emanating from a central point, and may thus be referred to as a "radial basis". This basis may have the advantage that there are many fewer elements to the filter basis than with other approaches, which may speed up all subsequent computations. Normally, there would be some sacrifice of information by combining many filter elements into one. However, since the blur kernels being dealt with are radially symmetric already, there may actually be very little information loss.

One method of computing a radial filter element is to take the inverse Fourier transform of a 2D data array that has absolute value of 1 in a ring of distance F from the (0,0) position, and that has a symmetric real part and an anti-symmetric imaginary part, where F is the spatial frequency of the radial basis element. There are two ways of producing the anti-symmetric imaginary part that yield orthogonal filters, and thus there are actually two radial filters per frequency F. In some embodiments, the radial basis may also be multiplied by a Gaussian, as mentioned above. This may serve to erase sharp edges from the window.

In some embodiments, to obtain the "frequency response" corresponding to a particular element in the filter basis of the signal in an image window, the system may take the first element-wise product of the real part of each filter element with each corresponding window element, may sum the results, and may save them in a temporary variable, A. The system may next do the same with the imaginary part of the filter element, and may save the results in a temporary variable B. In this example, the frequency response may then be as follows:

$$R=\sqrt{A^2+B^2}$$

In some embodiments, rather than computing the power spectrum of the input image itself, the system may be configured to compute the power spectrum of the X and Y gradients of the image. The X and Y gradients of the image reflect the differences between adjacent pixels horizontally and vertically, respectively. In other words, the system may be configured to generate X and Y gradient images and to compute the power spectrum of the resulting windows of these gradient images.

As a notational convention, index elements of the filter basis may be represented herein by "i", so that the $i^{th}$ filter will be denoted F(i). Likewise, the $i^{th}$ filter response for the window centered at position P will be denoted $R_x(P,i)$ or $R_y(P,i)$ for the X and Y gradients, respectively. In the examples described herein, N may denote the number of elements in the filter basis.

Given the above, the computation that is performed at this step in the blur classification exercise is to compute the frequency response, i.e., the arrays $R_x(P,i)$ and $R_y(P,i)$, for i=1 to N, and for P, iterating over all pixel positions in the image.

Note that the blur induced by an out-of-focus lens may in some embodiments be accurately modeled by a blur kernel that has a constant value inside a circle or regular polygon with five or more sides, and that is zero outside of the circle or regular polygon. For example, various polygonal shapes may come from the shape of the camera shutter. However, using a circular blur kernel has been found to work well in practice. In the descriptions herein, such circular blur kernels may be referred to as "disk kernels". Note that if the camera that was used to produce a digital image is known, the method may in some embodiments tailor the blur kernels to exactly match those of the camera for greater accuracy.

As noted above, at this point in the computation, a representative set of blur kernels may be chosen that will model (to a good degree) the blur found in all areas in the image under consideration, with the exception that in some embodiments it may not be necessary to model those areas of the image that are blurred by a disk kernel larger than about 20 pixels in diameter. In such embodiments, all of those very blurred areas may be adequately modeled by the largest blur kernel in the set. In various embodiments, the selection of the set of blur kernels may be automatic (i.e., performed by a blur classification module), may be influenced by user input, and/or may be based on default values for the system.

The chosen blur kernels may be referred to herein as the "kernel set". In some embodiments, the system may employ a kernel set comprising disc kernels whose radii are integers (in units of pixels) from 0 to about 10. In this example, a radius of 0 may correspond to no blur. Note that in various embodiments, the radii may not need to be exact integers, but the best result may be obtained when they are evenly spaced. For example, it may be advantageous to have the radii in an arithmetic sequence, such as 0, 1.5, 3.0, and 4.5. In different embodiments, it may be advantageous to use fewer blur kernels (e.g., to save time) or to use more blur kernels (e.g., in the case of a high resolution image and/or to achieve more accurate results at the cost of more expensive computations). In the notation used herein, there are M kernels in the kernel set, and they are indexed by j. The $j^{th}$ blur kernel in the set will be denoted B(j).

As a preprocessing step, the system may be configured to compute the frequency power spectrum of each of the possible blur kernels (or each of the likely blur kernels selected for inclusion in the kernel set), just as was done for each of the possible image windows. This information may be computed and stored in a two-dimensional array U that is indexed by filter basis i and kernel j.

Note that the system described herein may use any set of blur kernels. For example, to detect motion blur as well as lens blur, the system may include motion blur kernels in the kernel set. In general, there may not be a limit as to the type or number of blur kernels used. However, the processing time may increase linearly with the number of kernels in the set. Also note that if the blur kernels are not radially symmetric, it may not be optimal to use the radial filter basis mentioned above in the computations described herein.

Figure 3:
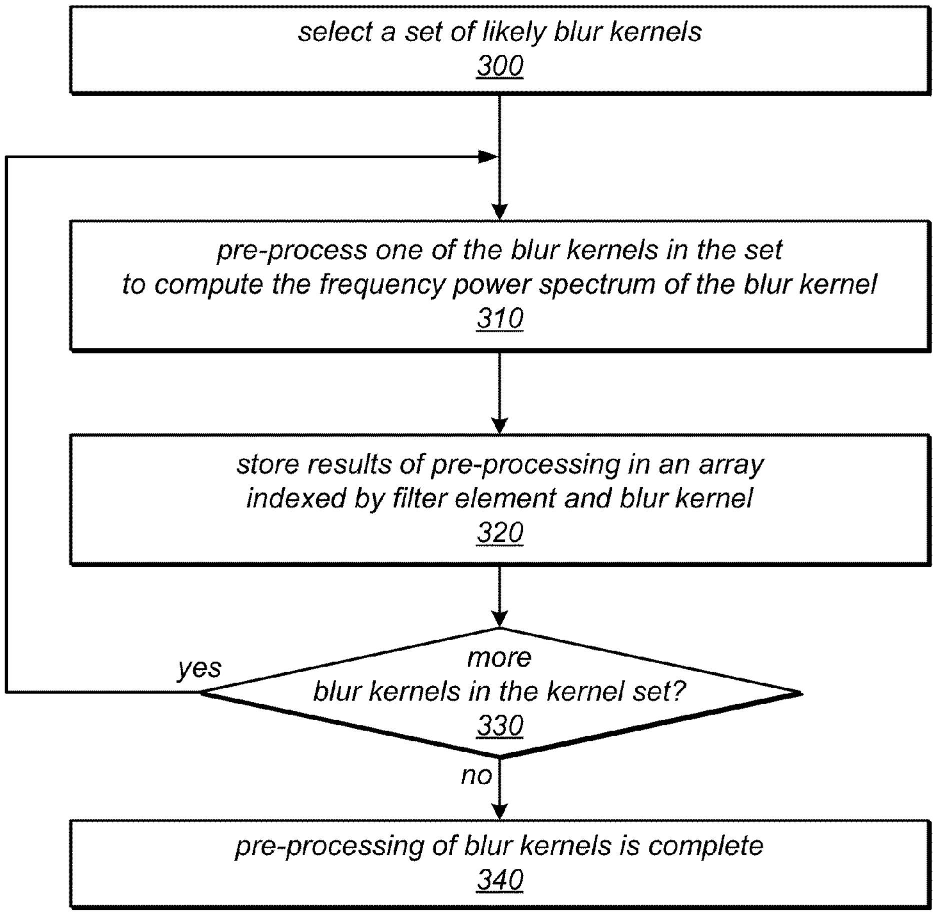
FIG. 3 is a flow diagram illustrating a method for pre-processing a set of blur kernels, according to some embodiments.

FIG. 3 is a flow diagram illustrating a method for pre-processing a set of blur kernels, according to some embodiments. In various embodiments, the operations illustrated in FIG. 3 may be implemented in software, in hardware, or in a combination of hardware and software. For example, in some embodiments, they may be performed by one or more modules of an image editing application or by one or more standalone software modules configured to perform them. As illustrated at 300, in this example, the method may include selecting one or more likely blur kernels. In various embodiments, the blur kernels in the set may be selected automatically from a representative set of blur kernels, may consist of a pre-defined set of blur kernels, may be selected by a user from available options, and/or may be selected automatically based on a user specification of the number of blur kernels to be included in the set. The method may include pre-processing one of the blur kernels in the set of blur kernels to compute the frequency power spectrum of the blur kernel, as shown in 310 and described above.

The results of this pre-processing may be stored for use in subsequent computations, as in 320. For example, they may be stored in an array indexed by an identifier of a filter element (e.g., a filter element number) and an identifier of the blur kernel (e.g., a blur kernel number, which in some embodiments may represent the blur radius or another parameter of the blur kernel). If there are more blur kernels in the set of likely blur kernels, shown as the positive exit from 330, the method may include repeating the operations illustrated in 310-320 for the remaining blur kernels in the set. This is shown in FIG. 3 as the feedback from 330 to 310. Once there are no more blur kernels in the set to be processed, shown as the negative exit from 330, the pre-processing of the blur kernel set may be complete, as in 340.

As noted above, the blur classification method illustrated in FIG. 1 may include, for each blur kernel and each pixel, computing the likelihood that a given blur kernel B(j) blurs the pixel at position P. To compute this likelihood, the system may in some embodiments make various assumptions about the nature of the values in the fictional sharp image from which the blurred image was obtained. For example, these assumptions may be based on studies of the statistics of pixel values in sharp natural images. In particular, it may be advantageous to work with the image gradients in the X and Y directions mentioned above. For example, it may be shown that a zero mean, normal random variable distribution may be used to represent the image gradients, and that the distributions may be independent of each other. However, the standard deviation for the actual values of the gradients in the window around a given pixel may be unknown.

Note that the $i^{th}$ filter response of the power spectrum of such a fictitious sharp image may also have a zero mean, normal distribution, and its standard deviation may be S*A where S is the standard deviation of the pixel values in the window, and A is the L2 norm of the $i^{th}$ filter. In some embodiments, it may be convenient then to normalize all of the filters ahead of time (i.e., prior to applying them in a blur classification exercise) to have an L2 norm of 1. Thus, the values in the power spectrum of a window may have the same standard deviation, S. If the filters are orthogonal to each other, the distributions may be independent as well. In some embodiments, the filter elements may also be orthogonal to each other. However, in other embodiments this may not be strictly necessary, and adjustments may be made to the blur classification techniques described herein to correct for a lack of orthogonality.

Note that if all of the pixels in the image window are blurred by the r blur kernel, B(j), it can be shown that the resulting power spectrum will be the element-wise product of the power spectrum of the un-blurred window with the power spectrum of the blur kernel. In some embodiments, the power spectrum for the blur kernel may be computed as described above. If the standard deviation S of elements in the window were known, then the probability distribution of the $i^{th}$ element in the power spectrum of the blurred window may be described as a zero mean, normal distribution with standard deviation S*U(j, i), where U(j,i) is the $i^{th}$ element of the power spectrum of the $j^{th}$ blur kernel. Using a Bayesian approach, the probability that the elements in the blurred power spectrum actually came from normal distributions with those standard deviations may be computed as follows:

$$L(p,j)=\frac{\prod_i \exp(-(R_x^2(p,i))/(2(U(j,i)^2S^2+Z^2)))}{\sqrt{U(j,i)^2S^2+Z^2}} \quad \text{(Eq. 1)}$$

In this example, Eq. 1 may be used to compute the likelihood that the power spectrum of the X gradient of the window around pixel P came from blur kernel j. By replacing $R_x$ with $R_y$, the same equation may be used to compute the likelihood with respect to the Y gradient, as follows:

$$L(p,j)=\frac{\prod_i \exp(-(R_y^2(p,i))/(2(U(j,i)^2S^2+Z^2)))}{U(j,i)^2S^2+Z^2}$$

In this example, L(p,j) may be computed as the product of these two likelihoods (the one computed for the X gradient and the one computed for the Y gradient.)

Note that Eq. 1 and its equivalent in the Y gradient are also functions of the unknown standard deviation S. Since S is unknown, the system may in some embodiments be configured to solve for the value of S that maximizes each of these functions, and then to plug that S back into Eq. 1 (and its equivalent in the Y gradient) to compute the probability that pixel P was blurred with blur kernel j. This maximizing procedure may be justified by various theoretical arguments, which are not discussed here. Note that it may be useful to save the value of S that maximizes the likelihood, as this may provide an estimate of the standard deviation of the pixels in the window around P in the fictitious sharp image. As described in more detail below, that S may be useful in resolving some ambiguities, in some embodiments.

As described above, in some embodiments, the system may compute all the values in the array L. In some embodiments, a final step in the computation of the values stored in L may be that for each pixel, P, the probability values stored in L are normalized so that their sum is one. In such embodiments, the sum of L(P, j) for j=1 to M may be computed, then each of the L(P, j) values may be divided by this sum. Thus, the values in L(P, j) for a given pixel P may represent a true probability distribution for the pixel P being blurred by a set of different blur kernels.

Figure 4:
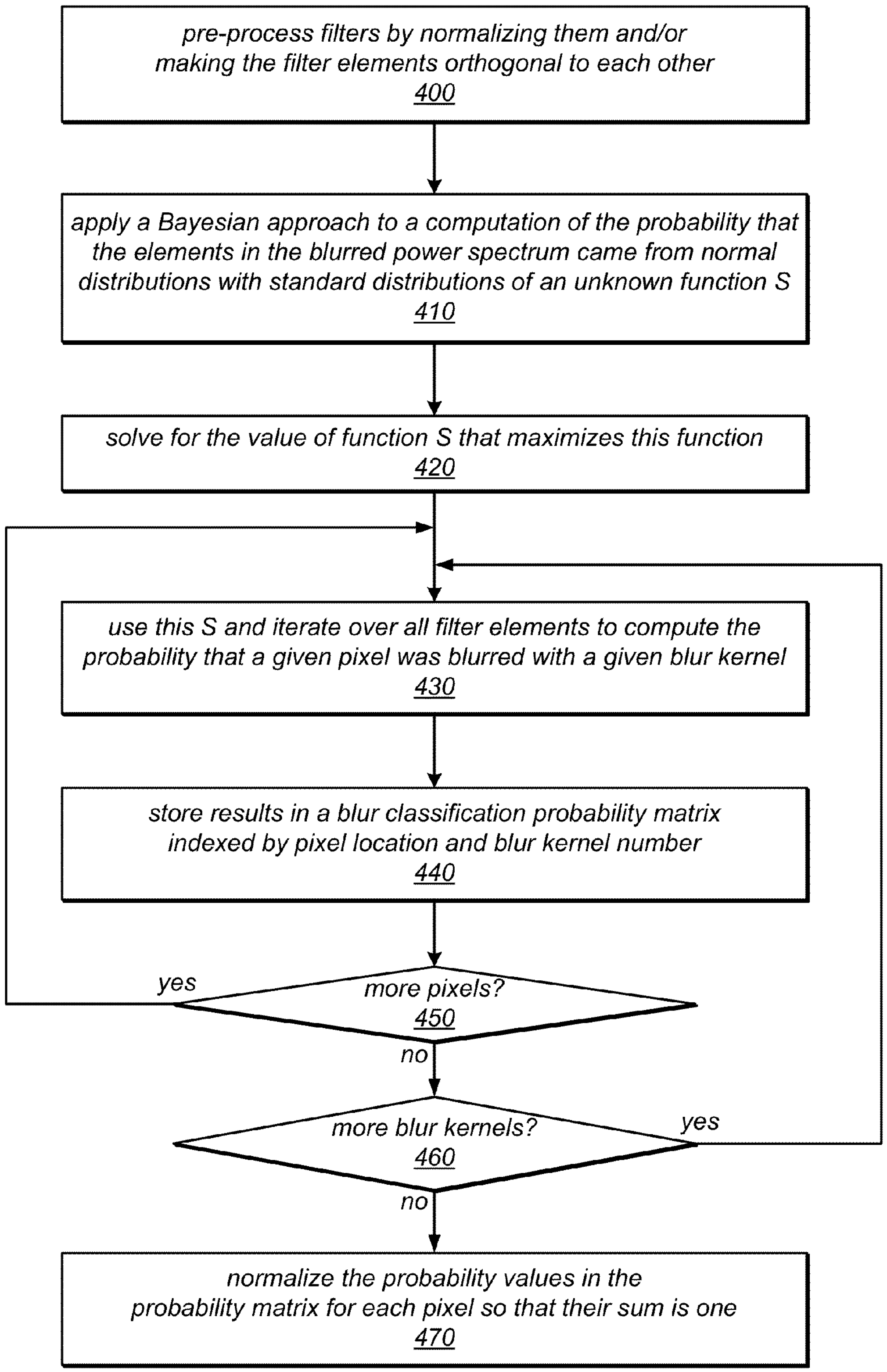
FIG. 4 is a flow diagram illustrating a method for computing the values stored in a blur classification probability matrix, according to some embodiments.

FIG. 4 is a flow diagram illustrating a method for computing the values to be stored in a blur classification probability matrix, according to some embodiments. In various embodiments, the operations illustrated in FIG. 4 may be implemented in software, in hardware, or in a combination of hardware and software. For example, in some embodiments, they may be performed by one or more modules of an image editing application or by one or more standalone software modules configured to perform them. As illustrated at 400 in this example (and described above), the method may include pre-processing the filters to normalize them and/or to make the filter elements orthogonal to each other. As illustrated at 410, the method may include applying a Bayesian approach to a computation of the probability that the elements in the blurred power spectrum came from normal distributions with standard distributions corresponding to an unknown function S. The method may include solving for the value of S that maximizes this function, as in 420.

Once an appropriate function S has been determined, the method may include using this function and iterating over all filter elements to compute the probability that a given pixel was blurred with a given blur kernel, as describe above. This is illustrated in FIG. 4 at 430. The results of this computation may be stored in a blur classification probability matrix, as in 440. As shown in this example, the results may be stored in the matrix in a location indexed by the location of the given pixel in the digital image and the blur kernel (e.g., the blur kernel number). If there are more pixels for which to compute a probability value, shown as the positive exit from 450, the method may include repeating the operations illustrated at 430-440 may be repeated for each of the pixels of the image (or portion thereof) for which the probabilities are being computed.

If there are no more pixels for which to compute a probability value with respect to the given blur kernel, shown as the negative exit from 450, but there are additional blur kernels in the blur kernel set for which probability values are to be computed, shown as the positive exit from 460, the method may include repeating the operations illustrated at 430-450 for each of the remaining blur kernels in the blur kernel set. This is shown in FIG. 4 as the feedback from 460 to 430. As described above, in some embodiments, the method may include normalizing the probability values stored in the blur classification probability matrix for each pixel so that their sum is one. This is illustrated at 470 in FIG. 4. Note that in some embodiments, this normalization may be performed as each pixel is processed, or as each probability value is computed rather than after all of the probability values have been computed. For example, in one embodiment the method may include computing probability values for all blur kernels for a given pixel, normalizing these results, and then moving on to the next pixel.

In the preceding discussion, a few details have been omitted for the sake of clarity, and will now be described. For example, it may be assumed that there is always some noise present in the input image data. This noise is accounted for in Eq. 1 as the Z variable. Note that, in some embodiments, the effect of a large amount noise may be that all of the likelihoods for the different blur kernels are more equal (i.e., closer in value to each other) than when there is less noise. Note also that, in some embodiments, the standard deviation of the samples in an image window, S, may have the inverse effect on this equalizing effect. For example, for a fixed noise level, when S is larger, the likelihoods may be less equal (i.e., the values may be farther from each other) than when S is smaller. The ratio of S to Z is the signal-to-noise ratio of the image. In some embodiments, the smaller this signal-to-noise ratio is, the more the likelihoods will be equal (i.e., the more alike their values may be). Note that there may be parts of an image in which there is very little variation in the light level, such as in flat areas of a picture. In these areas, the technique described so far may have a hard time determining the correct the blur kernel. As described in more detail below, this situation may be improved by using data from nearby pixels where the data may be more certain.

Another detail that has been glossed over above is the fact that there may be many image windows that contain pixels that have been blurred to differing degrees. In this case, as in the low signal-to-noise ratio case, the results of the above analysis may be ambiguous, and the likelihoods computed may be spread out over a number of (essentially) equally likely blur kernels. Again, the techniques discussed below may improve the results. For example, such windows may typically be straddling a boundary between an in-focus and out-of-focus object, and there may be a sharp color boundary nearby. The system described herein may in some embodiments be configured to find the correct boundary between blurred and not blurred regions by snapping to the nearest color boundary.

Techniques for computing the value S, which is the estimated standard deviation of pixels in a window of the fictitious sharp image, are discussed above. Note that these techniques may yield a different value of S for each pixel position, p, and each blur kernel B(j). In some embodiments, S may be constructed as an array with the same dimensions as the probability matrix L, such that S(p, j) gives the standard deviation estimate of the sharp image at pixel p assuming it was blurred with blur kernel B(j). There are a number of improvements that may be made in the speed of these computations using these S values, as discussed in the following paragraphs.

One improvement in the calculation of S may speed up the time to compute the probability matrix by an order of magnitude. As noted above, S may be computed as the value that maximized Eq. 1 for a fixed pixel p and blur kernel B(j). In some embodiments, this maximization may be done via iterative approximation (as in some existing systems). One problem with this approach may be that even though it may be possible to determine directly whether the S that is computed is optimal, if it is not, only partial improvements may be made toward the optimal value over a series of steps, and these steps are computationally time consuming. In some embodiments, an alternate approach that may be less computationally expensive may be to estimate S directly from the blurry image as follows.

Recall that S is an estimate of the standard deviation of the pixels in the window around pixel p in the fictitious sharp image. Note that blurring an image tends to smooth out the image values. Thus, the standard deviation of pixel values in the blurred image may typically be less than that of the corresponding pixels in the sharp image. In fact, given various assumptions about the statistics of the image gradients, the amount to which the standard deviation will be attenuated by a given blur kernel may be predicted. For example, is has been found that ignoring the additive noise in the image model may tend to yield the best results. In some embodiments, the following attenuation coefficient may be computed for blur kernel B(j):

$$K_j=\sqrt{\Sigma_u B(j,u)^2} \qquad \text{Eq. 2}$$

In this example, $K_j$ represents the attenuation factor and B(j,u) represents the element of the blur kernel at a given offset u from the central pixel, which may be defined to be at position (0,0). The sum may be taken over all u for which the contribution is non-zero. The coefficient may be used to predict the value of S as follows:

$$S_{sharp}(p,j)=S_{blur}(p)/K_j \qquad \text{Eq. 3}$$

In this example, $S_{sharp}$ represents the usual S as above, and $S_{blur}$ represents the standard deviation of the blurred image around pixel p. Since the blurred image is available, $S_{blur}$ may be computed directly, and thus S may be computed using the formulas above. It may be useful to keep the value estimated by this technique above a certain minimum value, e.g., about 1E-8. In some embodiments, this version of S may be used with Eq. 1 to compute the likelihoods directly, i.e., without having to employ the slower, iterative computation. In some embodiments, the results of this technique have been found to be almost as good as those obtained using the iterative computation, while the computations may be much faster.

In some embodiments, these computations may be further improved by using the value computed by Eq. 2 and Eq. 3 above as the starting point in the iterative computation of S. This may eliminate the small loss of quality from using the faster technique, while still saving a great deal of time.

As previously noted, the window size is a critical parameter that may affect the accuracy and reliability of the computation of the values to be stored in the blur classification probability matrix. In some embodiments, it may be advantageous to have the accuracy advantage of a small window size, along with the more reliable estimates that may be obtained by using a larger window. Two ways to achieve this goal are described below, according to different embodiments.

One way to obtain these advantages may be to run the computation of the probability matrix several times, using a different value for the window size each time, and to use information from some of these runs to improve the accuracy of the other runs. For example, the computation may be run first using a default or typical value for the window size parameter, e.g., 61 pixels. Where the values stored in the blur classification probability matrix indicate that there is one blur kernel clearly preferred over all others, this value may be retained for the corresponding pixel. For pixels at which two or more blur kernels are reasonably possible, the computation may be re-run using a smaller value for the window size parameter, e.g., 41 pixels. In some embodiments, during this second run, the system may be configured to re-compute likelihoods only for those blur kernels that have already been found to be probable. If, after the second run, the results indicate that the blur for some of these pixels is more likely to be due to one of these probable blur kernel (rather than being equally likely to be due to any of these probable blur kernels), that information may be retained. For pixels that are still ambiguous, the system may be configured perform additional re-computations (e.g., a third computation using a window size of 31 pixels, or even more re-computations), and may repeat the preceding update of the most likely blur kernel following each re-computation.

This method may in some embodiments yield improved results because it may first identify portions of the image that are likely blurred by more than one kernel, and then uses a smaller window to obtain a higher positional accuracy. Note that a smaller window size may typically analyze less data and thus may yield proportionately less reliable results. However, when the number of likely blur kernels has been reduced by a previous computation, a smaller window may be less likely to stray from the correct values.

Another way to improve positional accuracy of a blur classification exercise may be to first compute the values stored in the blur classification probability matrix using a large window size, e.g., 61 pixels, as above. In embodiments that employ this alternate approach, the next step may be to compute the probability matrix again, using the same initial window size, but "deleting" pixels q from the window around pixel p for which the likelihood of blur kernel B(j) in the previous probability matrix is below a pre-determined threshold, e.g., 1/10. In this example, "deleting" these pixels from the computation may mean that evidence from that pixel, q, may not be considered in computing the likelihood for B(j) at p. Deleting pixels from consideration may in some cases may introduce a complication in the computation of the likelihood in that the resulting window around p may be irregular and may be missing pixels. In this example, an analog of Eq. 1 may still be employed. However, the values of the missing pixels may be allowed to vary so as to maximize the likelihood for the particular p and j. In some embodiments, this may involve an optimization over a large number of variables, but this optimization may be sped up by solving a related least squares problem.

As described above, the initial probability matrix L may in some embodiments be improved by computing a new probability matrix L' which excludes pixels from a window that are known to not follow the assumption of a constant blur across all pixels of the window. By iterating this procedure (e.g., replacing L with L' and computing a new L', and so forth) the system may in some embodiments get closer to an accurate estimation of blur even near boundaries in the image where the blur kernel changes abruptly. This is because near such a boundary the windows may be pruned so as to not consider pixels over the edge of a boundary between differently blurred pixels.

The two improvements described above may require several computations of the blur classification probability matrix L. In some embodiments, there may be various ways to speed up the process by not computing all of the L's at all of the pixels. For example, as noted above, there may be some loss of quality in using the direct estimate of S over that computed by maximizing the likelihood. This means that for some pixels these two methods may yield different results. This may be a sign that some of the assumptions in the model are not holding, and in particular it may indicate that the assumption that the blur is constant over the window is not holding. In some embodiments, the discrepancy in the two S values may be used to indicate which pixels may need iterative improvement and which may not.

In some embodiments, this concept may be used in conjunction with the approach described above for computing the probability matrix several times using different window sizes. In such embodiments, S may be computed first using a large window size and by employing the fast direct computation method described above. Subsequently, the system may determine the pixels in the set $\{p_i\}$ for which more than one iteration of the old way of computing S is required. For the pixels not in $\{p_i\}$, the likelihood values may be computed using the large window size. For those pixels in the set $\{p_i\}$, the window size may be reduced by some amount, and S may again be computed by the direct method. Again the system may determine how many iterations are required for convergence of S, and may identify a smaller set of pixels, say $\{q_i\}$ for which yet another iteration is required. In this example, $\{p_i\}$ may be replaced with $\{q_i\}$, and the method may continue as above until the number of pixels in the set $\{q_i\}$ is small or until some preset limit on the number of iterations is reached.

As previously noted, the results of the computations described above may in some embodiments be used in subsequent computations, including (i) to compute the local blur kernel that explains the appearance of each pixel in the input image (i.e., to create a coherent blur map), and (ii) to perform a binary segmentation of the input image, such that the pixels of the input image are segmented into two classes: pixels that are considered to be in focus (or sharp) and pixels that are considered to be out of focus (or blurry). In various embodiments, both of these computations may be performed using the computed likelihoods, stored in L(P,j), that an observed pixel P is the result of a blur kernel B(j).

In some embodiments, a simple solution for (i) may be as follows: at each image pixel P, find the blur kernel that is most likely at pixel P. In such embodiments, the system may be configured to solve for j*(P)=arg max_{j} L(P,j). The blur kernel that gives the maximum likelihood at pixel P is B(j*(P)). This may provide a solution to (i), but the result may in some cases be a very noisy and non-smooth labeling. This may be because the likelihoods themselves are noisy due to modeling assumptions that are only partially satisfied, and/or because there is a large amount of image noise. There may also be inherent ambiguities in the observed data, which may require looking at the pixels in the neighborhood to resolve the ambiguities. For example, the system may need to determine whether an observed uniform area is perfectly sharp or heavily blurred. For real world scenes, the amount of blur is typically smooth over most areas of the image. Therefore, this simple solution may likely result in an inaccurate and undesirable labeling. In some embodiments, when choosing the blur kernel at pixel P, this greedy solution may consider only the likelihoods computed for pixel P and not for any of its neighbors. In some embodiments, a more coherent blur map may be obtained by adding a smoothness term to the objective function that encourages neighboring pixels to have similar blur estimates. The smoothness term is described in more detail below, according to some embodiments.

There may be similar concerns for performing a binary segmentation into sharp and blurry areas, as in (ii) above. For example, a simple solution for (ii) may be as follows: at each image pixel P, mark P as sharp if the likelihood L(P,0) that there is no blur at P is greater than the likelihood L(P,>0) that there is some blur at P. In the case that blur kernels are disks of radius j, a small improvement in flexibility of this simple solution may be to specify a radius r* which represents the maximum amount of blur at a pixel that should be considered sharp. In some embodiments, using this "in-focus radius" r*, the simple algorithm may be modified such that it is configured to mark P as in focus or sharp if the likelihood L(P,<=r*) >L(P,>r*). Both versions of this simple algorithm may result in incoherent selections of what is in focus because the likelihood evidence may be imperfect and noisy, as discussed above. Therefore, the labeling may quickly switch between sharp and blurry labels in a small image area, resulting in many small, disconnected regions of sharp or blurry pixels. For real world scenes, such an unsmooth, incoherent result may typically be incorrect. Also, the true boundaries between sharp and blurry areas may tend to fall along color edges in the input image. In some embodiments, the solution to these problems may consider a neighborhood around pixel P when deciding whether to label P as sharp or blurry.

In various embodiments, there may be a common framework for obtaining coherent, desirable answers to the computations for both (i) and (ii). For example, both of these computations may be thought of as labeling problems. In (i), the labels may be the identifiers j of possible blur kernels B(j), j=1, . . . , M. In embodiments in which the possible blur kernels are assumed to be disks, the labels may represent the disk radii of each of the blur kernels in the kernel set. For problem (ii), there may be only two labels: blurry (0) or sharp (1). A common objective function that may be minimized in order to produce coherent labeling may be given by the cost of an energy function E(Φ) as follows:

$$E(\Phi) = \sum_{p} D_p(f_p) + \sum_{(p,q)\in N} V_{pq}(f_p, f_q)$$

In this example, Φ={fp} denotes a labeling over all pixels P, N represents the set of pairs of neighboring pixels, $D_p(f_p)$ represents the cost of assigning label $f_p$ to pixel p, and $V_{pq}(f_p, f_q)$ represents the cost of assigning labels $f_p$ and $f_q$ to neighboring pixels p and q, respectively. Note the change of notation for a pixel from P to the more traditional p used in the labeling problem literature.

In some embodiments, for applications (i) and (ii), the single pixel labeling costs $D_p(f_p)$ may be derived from the blur likelihoods, and may provide the fundamental but noisy evidence for the labeling of a given pixel. The pair-wise pixel labeling costs $V_{pq}(f_p, f_q)$ may be used to encourage neighboring pixels to have similar labels (resulting in smoother results), and to encourage sharp-blurry boundaries of a binary segmentation to occur at color edges within the image.

Before describing the details of the D and V functions for applications (i) and (ii), various approaches for minimizing the labeling problem energy function E(Φ) are described. In some embodiments, casting the coherent blur estimation problem (i) and binary segmentation problem (ii) as minimum cost labeling problems may enable the system to use existing energy minimization techniques such alpha expansion and belief propagation to solve these problems. An explanation of the alpha expansion algorithm is described below, according to various embodiments.

The alpha expansion technique for minimizing the labeling problem energy function E(Φ) is a minimum graph cut technique that has been described in the literature. In some embodiments, the alpha expansion algorithm may start by setting an initial labeling Φ for all pixels in the image. For example, in various embodiments, the alpha expansion algorithm may begin by initializing all labels to the same value (such as the maximum label value) or by setting Φ for each pixel to the result indicated by the greedy algorithm described earlier. In either case, the system may then iterate through all possible labels α, to determine whether the current labeling Φ can be improved (i.e., to determine whether the energy E(Φ) decreased) by changing the labels of some pixels to label α. Such a change is called an alpha expansion (or α-expansion) because the $\alpha_s$ in the current labeling estimate can only be expanded as a result of this step. In some embodiments, this algorithm may cycle over and over again though all the possible labels α, stopping when no further improvement can be made for any label. For each α-expansion, a minimum cut graph problem may be constructed so that cuts of the graph are in one-to-one correspondence with possible α-expansions, and the cost of the minimum cut is equal to the energy after performing the best possible α-expansion.

Figure 5:
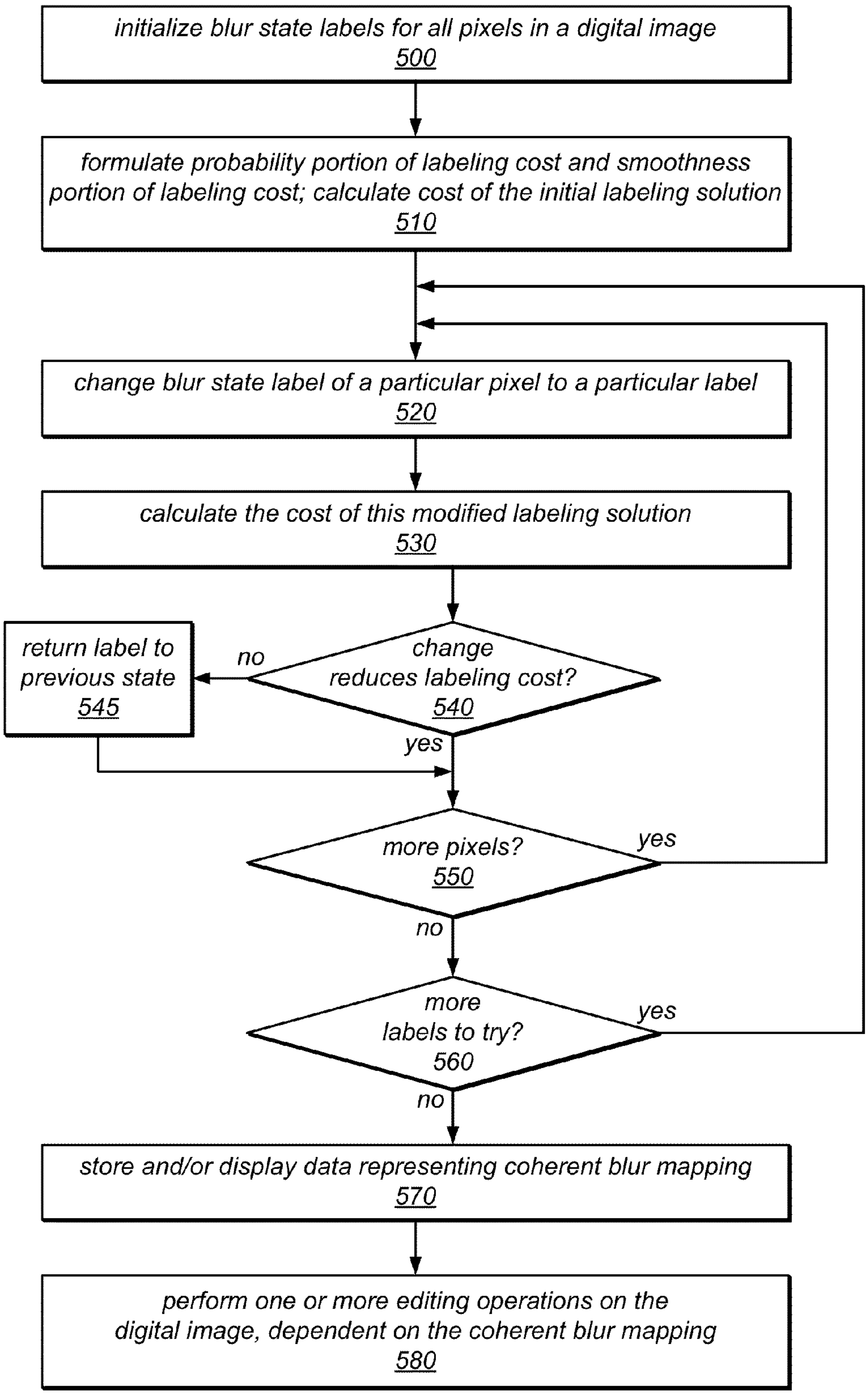
FIG. 5 is a flow diagram illustrating a method for creating a coherent blur mapping for a digital image, according to some embodiments.

FIG. 5 is a flow diagram illustrating a method for creating a coherent blur mapping for a digital image, according to some embodiments. For example, the method may be used to generate a coherent mapping between each pixel of the digital image and a respective one of a set of possible blur states indicating the degree of blur at the pixel. In various embodiments, the operations illustrated in FIG. 5 may be implemented in software, in hardware, or in a combination of hardware and software. For example, in some embodiments, they may be performed by one or more modules of an image editing application or by one or more standalone software modules configured to perform them. As illustrated at 550, in this example, the method may include initializing a set of blur state labels for all pixels in a digital image (or a portion of a digital image on which a blur classification operation is to be performed). For example, in various embodiments, the blur state of all pixels may be initialized to the same value (e.g., no blur, or a default blur value), or the blur state of each pixel may be initialized to the blur state that the corresponding values stored in a blur classification probability matrix for the digital image indicate is the most likely blur state for that pixel (e.g., according to the greedy blur classification algorithm described above). As illustrated at 510, the method may include formulating a labeling cost function (such as those described above), and calculating the cost of the initial labeling solution. For example, the labeling cost function may include a portion that is based on a blur classification probability matrix and a portion based on a configurable smoothness constraint, as described above.

As illustrated in this example, the method may include applying an alpha expansion technique to attempt to determine the lowest cost labeling solution. For example, the method may include changing the blur state label of a particular pixel to a particular (e.g., different) label (as in 520) and calculating the cost of this modified labeling solution (as in 530). If the label change does not result in a reduced labeling cost, shown as the negative exit from 540, the method may include returning the label to its previous state, as in 545 (e.g., its initial state, or a state that resulted in a reduced cost during a previous iteration of the alpha expansion exercise). If the label change results in a reduced labeling cost, shown as the positive exit from 540, the particular pixel may retain the new label (at least for this iteration of the alpha expansion exercise).

As illustrated in FIG. 5, the method may include iterating through all pixels of the digital image (or targeted portion thereof) and all possible labels until it is determined that the labeling solution results in a local or global minimum cost. This is illustrated in FIG. 5 as the feedback loop from 550 to 520, and the feedback loop from 560 to 520.

Once the alpha expansion exercise is complete, the method may include storing and/or displaying data representing a coherent blur mapping, as in 570. For example, each pixel may be assigned a blur state value representing a blur kernel identifier (which may represent a blur kernel radius, a value of another blur kernel parameter, or simply a numerical identifier of a blur kernel in the kernel set, in different embodiments). In some embodiments, this coherent blur mapping may be employed in a subsequent image editing operation, as in 580. For example, a user may be able to specify that a given editing operation (e.g., a change in lighting, color, contrast, or other image characteristics, or a cropping, scaling, or other type of image editing operation) be directed to the "subject" of a digital image, or to the "background" in a digital image. In such embodiments, an image editing application may be configured to perform the editing operation on portions of the image that are selected automatically based on whether the blur states of various pixels have a particular value (e.g., "blurry" or "sharp") or are within a given range of values, e.g., without the user needing to explicitly identify a "subject" of the image or the "background" portion of the image. For example, in a cropping operation targeting the subject of a digital image, the application may be configured to identify the subject based on the blur states of the image pixels, and to crop the digital image to remove some of the background pixels of the image (e.g., leaving a frame of background pixels around the subject), or all of the background pixels (e.g., isolating the subject).

As previously described, in some embodiments, the results of the methods described herein for estimating the amount of blur present at any location in a digital image may be used as an aid to depth estimation. In such embodiments, a user may invoke a depth estimation feature to estimate the depth (i.e., the distance from the camera) of one or more elements of the digital image (e.g., objects in the image or portions thereof), based on the coherent blur mapping. For example, a depth estimation tool may be configured to receive input identifying an object or a portion of a digital image for which to estimate the depth, may access a blur classification probability matrix for the digital image, and may estimate the depth of the identified object or portion of the digital image based (at least in part) on the values stored in the blur classification probability matrix and corresponding to the pixels making up the identified object or portion of the digital image.

In some embodiments, the alpha expansion algorithm described above may be applied to solve a two-label problem, as well. For example, a binary segmentation of a digital image may in some embodiments be solved by simply initializing all the labels to the maximum label value of 1, and then running a single alpha expansion step to expand the label 0. In such embodiments, only one minimum graph cut problem may need to be solved. In this case the algorithm may be guaranteed to find the labeling $\Phi^*$ that yields a global minimum of the energy $E(\Phi)$. Note that only a strong local minimum may be guaranteed for the alpha expansion algorithm when it is applied to a labeling problem with more than two labels.

In some embodiments, however, a more direct minimum graph cut problem than the alpha expansion formulation described above may be constructed to solve a two-label problem, and its solution may also guarantee a global minimum energy. In such embodiments, the graph nodes to be separated by a graph cut may include the image pixels to be labeled, and two special nodes called the source and sink. In such embodiments, the graph cut formulation may include bi-directional edges connecting neighboring pixel nodes (called n-links), as well as edges from the source to each of the pixel nodes and from each of the pixel nodes to the sink (called the t-links). In this example, the edge weights on the t-links for pixel p are the D values $D_p(0)$ and $D_p(1)$, and the edge weights on the n-links between pixels p and q are the V values $V_{pq}(0,1)=V_{pq}(1,0)$.

Note that in various embodiments, there may be many possible D and V functions that may result in coherent blur maps. As described herein, the labels may be identifiers j for the possible blur kernel B(j). For example, in some embodiments, the portion of the cost of labeling that is dependent on the computed probability by be computed as the negative log likelihood that a blur kernel j blurred a pixel p, as follows:

$$D_p(j)=-\log L(j,p)$$

In some embodiments, since the goal may be to minimize the energy over the labeling, larger likelihood values may result in lower costs/energies. This is the reason for the minus sign in the equation above. In other embodiments, the system may be configured to use the computed likelihood directly for the portion of the cost of labeling that is dependent on the probability matrix values, as follows:

$$D_p(j)=-L(j,p)$$

In some embodiments, a V function that may be used to encourage a smooth coherent blur map when a label j represents the radius of a potential disk blur kernel may be as follows:

$$V_{pq}(j_p,j_q)=\lambda|j_p-j_q|$$

Note that in this example, there would be zero cost to labeling adjacent pixels p and q with the same radius. In this example, the bigger the difference between the radii, the larger the penalty may be for labeling pixels in the same neighborhood with different radii. A generalization of this statement when the labels do not represent the radii of different disk kernels may be that $|j_p-j_q|$ represents some measure of how different the blur kernels $B(j_p)$ and $B(j_q)$ are. Note that even in embodiments in which the labels represent disk radii, other measures of the difference between the blur kernels in a kernel set may be possible and may be considered in the V function. For example, in various embodiments, the V function may be dependent on the squared difference between the radii instead of the absolute value of the difference, or may use a constant penalty for assigning any pair of different blur kernels to adjacent pixels (or pixels in the same neighborhood, e.g., within a given distance) rather than a penalty that depends on "how different" the blur kernels are.

In the example above, the parameter $\lambda$ represents a smoothness parameter on the optimal labeling. The larger the value of $\lambda$, the smoother the final labeling may be because the high cost of labeling neighboring pixels differently will encourage neighboring pixels to have similar labels. In the limit as $\lambda\rightarrow\infty$ (i.e., as the solution approaches maximum smoothness), the optimal labeling may approach a labeling solution in which the same label is assigned to each pixel. In the limit as $\lambda\rightarrow 0$ (i.e., as the solution approaches a result with no smoothness), the optimal labeling may approach the greedy labeling discussed earlier, i.e., a solution that does not consider information from the neighbors of a given pixel.

Note that the in the examples described herein, estimates S(p,j) may all refer to the fictitious sharp image discussed above. Even though this image may not be recovered exactly, it may theoretically exist. If the correct blur kernel has been chosen at each position p in the image, the corresponding S(p, j) should represent the standard deviations of a window moving over the sharp image. In some embodiments, because the pixels included in the standard deviation computation may be almost the same from one pixel p to an adjacent pixel q, the values of S(p, $j_p$) and S(q, $j_q$) may also be almost the same. Note again that, in this example, $j_p$ represents the choice of j for pixel p and likewise for $j_q$. When Gaussian windowed functions are used in the filter basis, the rate of change may be guaranteed to be even less.

In some embodiments, this prior constraint on S may be used to influence the choice of the blur kernel B(j) at each point in the alpha expansion algorithm, which may improve the coherence of the blur map. In such embodiments, $j_p$ and $j_q$ may be chosen such that the corresponding S values, S(p, $j_p$) and S(q, $j_q$) are close to each other. This bias, for example, may be included in the V part of the energy minimization function used in the alpha expansion exercise. For example, the V function described above may be modified to be as follows:

$$V_{p,q}(j_p,j_q)=\lambda|j_p-j_q|+\mu|S(p,j_p)-S(q,j_q)|$$

In this example, μ represents a weighting factor for this information.

Figure 6:
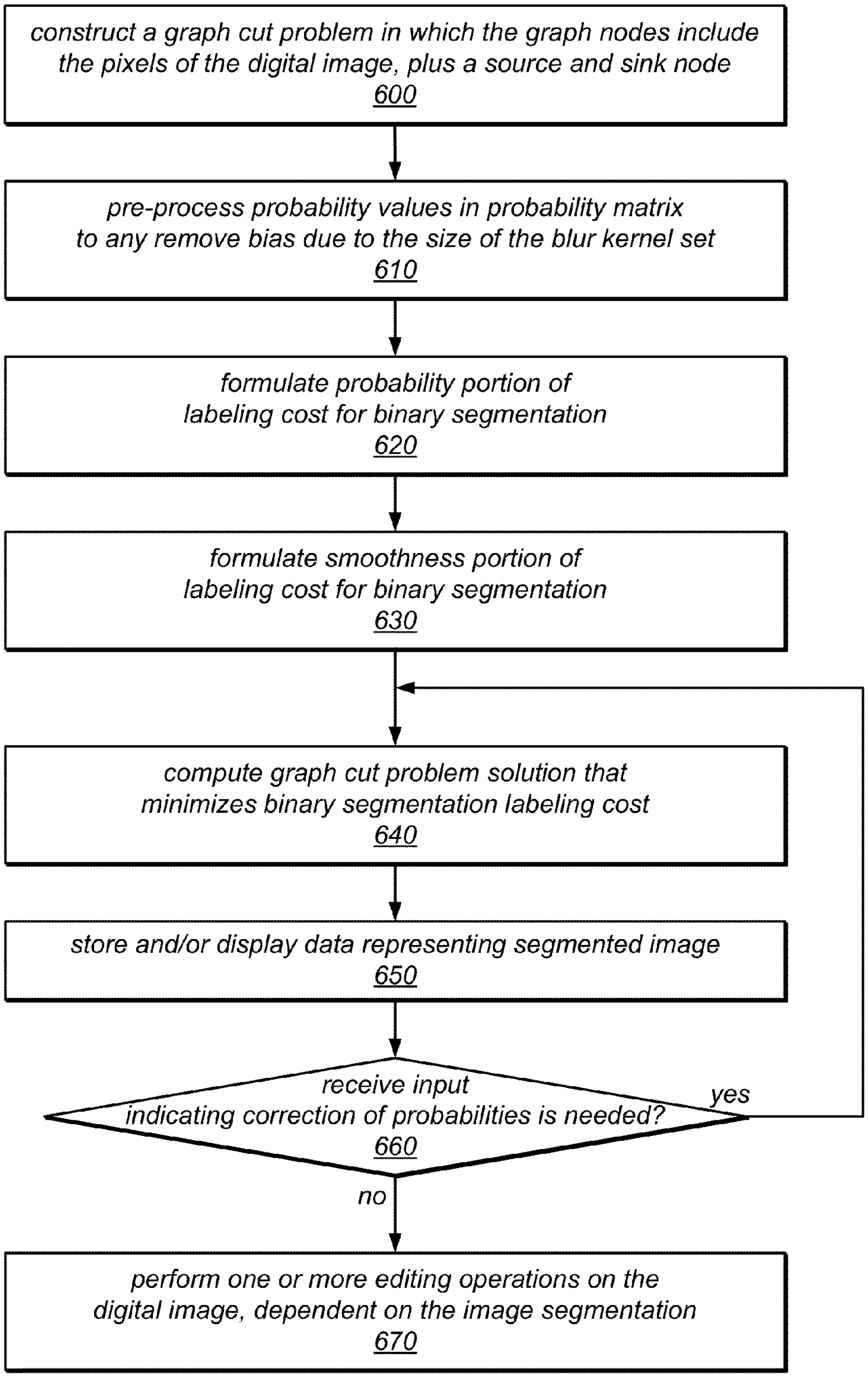
FIG. 6 is a flow diagram illustrating a method for performing a binary segmentation of a digital image into sharp and blurry regions, according to some embodiments.

FIG. 6 is a flow diagram illustrating a method for performing a binary segmentation of a digital image into sharp and blurry (i.e., out-of-focus) regions, according to some embodiments. In various embodiments, the operations illustrated in FIG. 6 may be implemented in software, in hardware, or in a combination of hardware and software. For example, in some embodiments, they may be performed by one or more modules of an image editing application or by one or more standalone software modules configured to perform them. As illustrated at 600, in this example (and described above), the method may include constructing a graph cut problem in which the graph nodes include the pixels of the digital image, plus a source node and a sink node. The graph cut problem may also include bi-directional edges that connect each image pixel to the source and sink nodes. As illustrated in this example, the method may include pre-processing the probability values stored in a blur classification probability matrix to any remove bias due to the size of the blur kernel set, as in 610.

As illustrated in FIG. 6, the method may include formulating a labeling cost function (such as those described above) for the binary segmentation. For example, the labeling cost function may include a portion that is based on values stored in a blur classification probability matrix (as in 620) and a portion based on a configurable smoothness constraint (as in 630). To compute the cost of assigning a given label to a particular pixel, probability values stored in the blur classification probability matrix and other information described above may be plugged into these portions of the cost function.

In some embodiments, the method may include computing a graph cut problem solution that minimizes the binary segmentation labeling cost, as in 640. Following the successful application of the application of the graph cut technique, the method may include storing and/or displaying data representing a segmented image, as in 650. For example, the method may include displaying a binary mask of the digital image, indicating the sharp portions and the blurry (out-of-focus) portions, in some embodiments. In some embodiments, data representing such a binary mask may be stored as an array of blur state values (0 or 1) indexed by the locations of the image pixels.

In some embodiments, a binary segmentation exercise may be refined according to user input, as described above. In such embodiments, the method may include receiving input indicating the need to correct one or more values in the blur classification probability matrix (and/or the binary segmentation result). For example, in some embodiments, an image editing application may include an interface through which a user may identify one or more "sharp" pixels that were labeled as "blurry" and/or one or more pixels that were labeled as "sharp" yet are actually out of focus. This is illustrated in FIG. 6 as the positive exit from 660. As illustrated in FIG. 6, if such input is received, the method may include modifying the probability values in the blur classification probability matrix and computing a new solution for the graph cut problem using these corrected probability values. This is shown as the feedback from 660 to 640. Note that the operations illustrated as 640-660 may be repeated two or more times to refine the results of the binary segmentation until the user no longer enters any corrections (i.e., until the user is happy with the results). This is shown in FIG. 6 as the negative exit from 660. Note that in some embodiments, similar user input may be applied to refine the results of an alpha expansion exercise or another approach that is applied to solve a labeling problem that includes more than two possible labels (not shown).

As in the example described above for creating a coherent blur mapping, the results of a binary segmentation exercise may be employed in a subsequent image editing operation, as in 670. For example, a user may be able to specify that a given editing operation (e.g., a change in lighting, color, contrast, or other image characteristics, or a cropping, scaling, or other type of image editing operation) be directed to the "subject" of a digital image. In such embodiments, the image editing application may be configured to perform the operation on portions of the image for which the blur state label is "sharp". Similarly, a user may be able to specify that a given editing operation be directed to the "background" in a digital image, and the image editing application may be configured to perform the operation on portions of the image for which the blur state label is "blurry".

As previously noted, there may be many possible D and V functions that may result in coherent binary segmentations into in focus (sharp) regions and out-of-focus (blurry) regions, in different embodiments. Consider, for example, embodiments in which the possible blur kernels are disks having different radii. In some embodiments, an in-focus radius parameter r* may be used to denote the break point between blur radii that result in pixels considered sharp and blur radii that result in pixels considered blurry. As in the non-binary blur estimation problem described in the previous section, the D function may be derived from the blur likelihood evidence as follows:

$$D_p(0)=-\log \Sigma_{r>r^*}L(r,p) \text{ and}$$

$$D_p(1)=-\log \Sigma_{r\leq r^*}L(r,p)$$

In this example, label 0 represents a blurry pixel and label 1 represents a sharp pixel. In this example, it may be assumed that likelihoods L(r,p) for each pixel have been normalized to sum to 1 over the possible radii r. In this example, the sum in the definition for $D_p(0)$ represents the probability that the true radius r is greater than the in-focus radius r*. In some embodiments, the larger that probability, the more likely it may be that p should be labeled as blurry, and the smaller the cost (as shown by the negative sign in the formula above). In this example, the sum in the definition for $D_p(1)$ represents the probability that the true radius r is less than or equal to the in-focus radius r*. In some embodiments, the larger that probability, the more likely it may be that p should be labeled as sharp, and the smaller the cost.

In some embodiments, in order to encourage segmentation boundaries to fall along image edges, the system may use the following V function:

$$V_{pq}(0,0)=V_{pq}(1,1)=0$$

$$V_{pq}(0,1)=V_{pq}(1,0)=\lambda\exp\left(-\frac{\|I(p)-i(q)\|^2}{2\sigma^2}\right)\frac{1}{\|p-q\|}$$

Note that this is a standard formulation used in segmentation problems. In this example, I(p) represents the color of the input image at pixel p. In this example, there is no penalty for assigning the same label (both sharp or both blurry) to adjacent (or neighboring) pixels. Thus smooth and coherent results are preferred. However, the cost to assign neighboring pixels p and q to different labels may be high if the color similarity at p and q is high. This may be desirable because such a labeling may tend to avoid placing a segmentation boundary at a place in the image that is not an edge in the image. In this example, the cost of assigning different labels at neighboring pixels may be low if the color similarity is low. This may be allowable because such a labeling may tend to put a segmentation boundary along an image edge. As described above, in some embodiments, a parameter λ may be used to control the smoothness and/or coherence of the optimal segmentation and to place an importance on defining a segmentation boundary along an edge in the image. In this example, the final term in the V function is the inverse distance between pixels. This term may give a smaller weight to the diagonal neighbors of a given pixel than to its horizontal and vertical neighbors.

There may be variations in the formulation described above that may produce similar results, in other embodiments. For example, in some embodiments, different measures of color difference may be used, such the L1 norm instead of the squared L2 norm. In some embodiments, different functions may be used to convert color distances to color similarity, e.g., using one function over the color distance instead of the exponential of the negative color distance squared. In some embodiments, a constant penalty may be added for assigning different labels to any pair of pixels. This may encourage a segmentation boundary of minimal Euclidean length and may result large blocks of pixels being assigned the same label (resulting in coherent segmentations).

As described above, the number of blur kernels considered may bias the computation in an undesirable way in regions of uniform color. In such regions, every blur kernel with support smaller than the region may appear to be equally likely. For example, suppose that the in-focus radius r* is fixed, e.g., r*=1. Further suppose that p is in the middle of a large constant image area. If 5 radii are considered (e.g., r=0, 1, 2, 3, 4), then the probability of each radius is ⅕, and the probability that the true radius is less than or equal to r* is ⅖=0.4 (adding the evidence for r=0 and r=1 because r*=1). If, however, 10 radii are considered (e.g., r=0, 1, 2, . . . , 8, 9), then the probability of each radius is 1/10, and the probability that the true radius is less than or equal to r* is 2/10=0.2 (again adding evidence for r=0 and r=1 because r*=1). However, in the situation that a uniform blur is actually likely, the cost of labeling a pixel as sharp should be the same as the cost of labeling the pixel as blurry (since there is nothing else that can be concluded by looking at the blur likelihoods in isolation for that pixel).

In some embodiments, the bias described above may be corrected by using the variance v of the blur likelihood values L(1,p), . . . L(M,p) for the M possible blur kernels B(j). In such embodiments, if v is zero, this may represent the case in which there is an exact uniform blur likelihood (i.e., all likelihood values are the same). If v is small, the situation may be close to a uniform blur likelihood. As v increases, the blur likelihood may be less uniform, and the problem described may be less severe. Therefore, in some embodiments, the following may be used to correct for the bias described above: and $$P_0=\Sigma_{r<r^*}L(r,p),$$

$$P_1=\Sigma_{r\le r^*}L(r,p),$$

and $$\rho=C/v, \text{ for some constant C.}$$

Note that in this example, $P_0$ and $P_1$ may be used to define the costs $D_p(0)$ and $D_p(1)$, and ρ may represent the degree to which the uniform blur likelihood problem exists (wherein ρ=∞ represents the case of an exactly uniform blur likelihood). In this example, ρ may be used to adjust the $P_0$ and $P_1$ in the costs $D_p(0)$ and $D_p(1)$ as follows:

$$\hat{P}_0=\frac{0.5\rho+P_0}{\rho+1}$$

and $$\hat{P}_1=\frac{0.5\rho+P_1}{\rho+1}$$

Note that in this example, when ρ=∞ (e.g., in the case of an exactly uniform blur likelihood), the result is $\hat{P}_0=\hat{P}_1=0.5$, as desired.

Note that when ρ=0 (e.g., in the case of a blur likelihood very different from a uniform blur), there will be no correction to the original formulation, since $\hat{P}_0=P_0$ and $\hat{P}_1=P_1$.

Figure 7A:
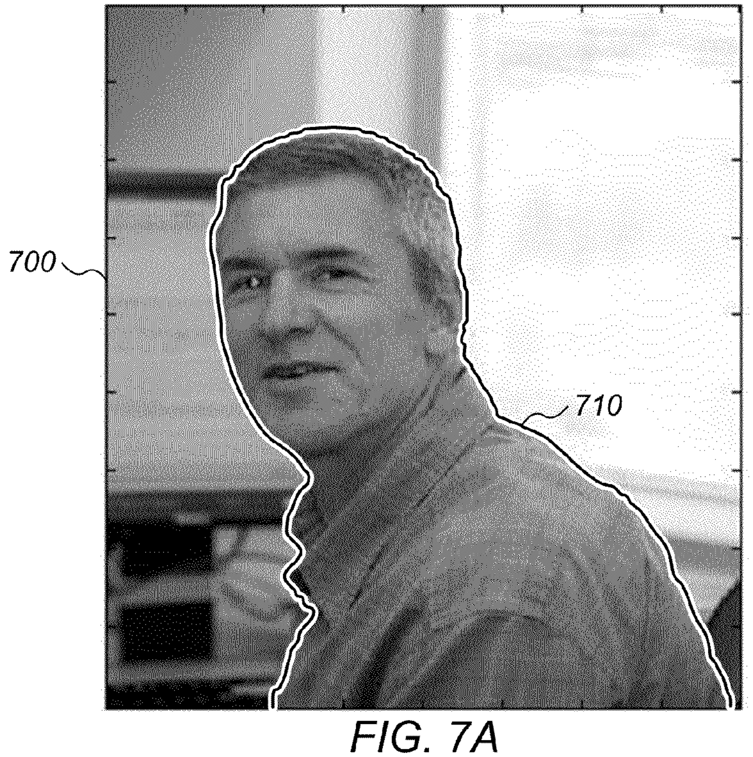
FIG. 7A illustrates a digital image in which a sharp region and a blurry region have been identified for segmentation, according to some embodiments.
Figure 7B:
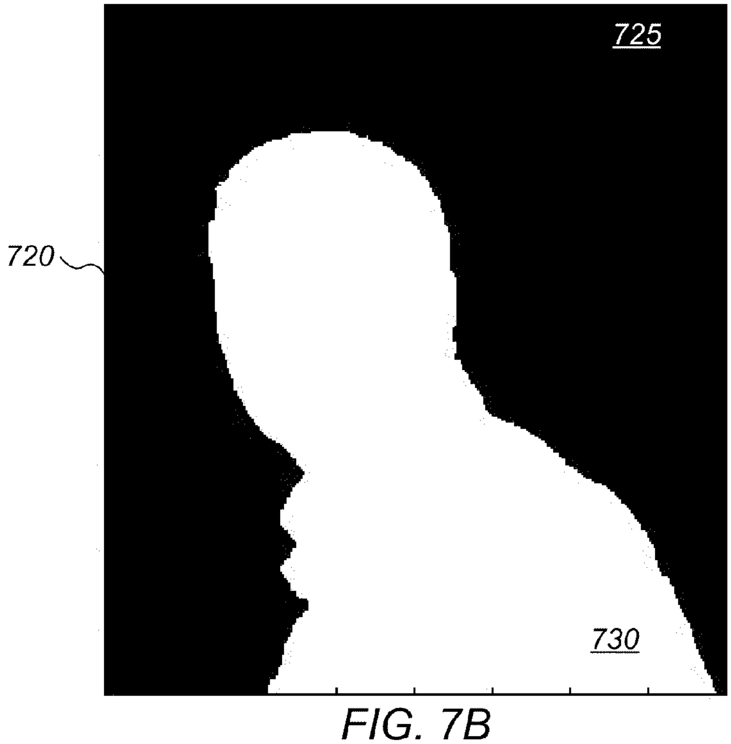
FIG. 7B illustrates a binary image mask representing the results of the segmentation of the image shown in FIG. 7A, according to some embodiments.

An example segmentation of an image into sharp and blurry regions using the methods described herein is shown in FIGS. 7A-7B, according to some embodiments. In this example, FIG. 7A illustrates a digital image 700 in which a sharp region and a blurry region have been identified for segmentation, according to some embodiments. Note that input image 700 may have been input as a grayscale image or may have been input as a color image and then converted to grayscale, as described above. In this example, the input image 700 includes an in-focus subject (a man) and an out-of-focus background (an office). In this example, the outline around the man in the image (labeled as 710) represents the computed boundary between the portion of input image 700 in which the pixels have been labeled as "sharp" and the portion of input image 700 in which the pixels have been labeled as "blurry" or "out-of-focus".

This segmentation was computed automatically without any user intervention. For this example, the algorithm parameters were set as follows: M=11 disk blur kernels with radii 0, 1, 2, . . . , 10, in-focus radius r*=1, noise variance=1E-3, window size=61, smoothness λ=1000.0, edge contrast σ=10.0, and C=1E-7. In this example, FIG. 7B illustrates a binary image mask 720 representing the results of the segmentation of input image 700, according to some embodiments. In this example, the white pixels in the portion of image mask 720 labeled as 730 indicate pixels labeled as "sharp" or "in focus", while the black pixels in the portion of image mask 720 labeled as 725 indicate pixels labeled as "blurry" or "out-of-focus".

In some embodiments, binary segmentation results may be improved by including color models for the sharp and blurry areas. In such embodiments, the parameters of the sharp and blurry region color models (e.g. a Gaussian mixture model) may be iteratively solved for along with the binary labeling. The procedure may be initialized with a segmentation obtained using only the blur likelihoods. Given a binary segmentation so obtained, the colors of pixels in the sharp and blurry regions may be used to find parameters of color models for these regions. These color models may be used in addition to the blur likelihoods as evidence for the next binary segmentation problem. Given the next segmentation, the color model parameters may be updated, and so on, until convergence is achieved. In some embodiments, local color models for sharp and blurry areas may be used instead of the global color models used in previous techniques. For example, local color models may account for the positions of colors in the image and may be used to model the likelihoods P(r,g,b,x,y|sharp) and P(r,g,b,x,y|blurry), i.e., the probabilities of observing a color, e.g., (r,g,b), at location (x,y) for both of the possible labels. Using local color models may in some embodiments provide discriminating labeling evidence for two distant areas with different labels but the same color.

In some embodiments, a binary segmentation may be obtained by solving a non-binary blur estimation problem and then applying a threshold to the assigned radii at r* to obtain the sharp-blurry binary segmentation. In such embodiments, a pixel may be labeled as sharp if and only if the computed blur radius r is ≤r*. In such embodiments, the smoothness costs V for the non-binary labeling problem may be modified to include an additional term that penalizes neighboring (e.g., adjacent) pixels which have been assigned blur radii that are on opposite sides of the in-focus radius r* (again, the penalty may account for a color edge that may be present at such a binary segmentation boundary). The idea and goal of the method may be to obtain a smooth, more "continuous" (i.e., less discretized) explanation of the blur behind a coherent binary segmentation.

The technique for segmenting an input image into sharp and blurry regions described above may often yield very good results, but may still not predict exactly what the user wanted in small areas of the image near the boundary between sharp and blurry portions of the image. In some embodiments, an additional means of making corrections to the binary segmentation (e.g., interactively) may be introduced to encourage results that are consistent with the user's goals and/or expectations. For example, in some embodiments, once the results of the segmentation are displayed on the computer monitor, the user may use the mouse or another pointing device to indicate two types of corrections directly at a given position in the image: (1) pixels which should be classified as sharp but were classified as blurry, and (2) pixels which should be classified as blurry but were classified as sharp.

In some embodiments, this additional information may be used to alter the binary probability matrix in a straightforward way, e.g., to force the classification of some pixels to a value of 1 or 0. In such embodiments, for pixels where corrections of type (1) apply, the probability that the pixel is sharp may be set to 1, and the probability that it is blurry may be set to 0. For pixels of type (2), the corresponding opposite actions may be performed.

Note that because of the coherency enforced by the alpha expansion exercise, it may not be necessary for the user to manually indicate all of the erroneously classified pixels. Instead, it may be enough for the user to identify a small subset of such erroneously classified pixels, and then to allow the alpha expansion algorithm to snap to the nearest color boundary that respects the corrected classification. In other words, the alpha expansion operation may serve to propagate the effects of the manual correction specified by the user. In embodiments that support this user intervention, the user may easily customize the results of the automatic binary segmentation exercise.

Figure 8:
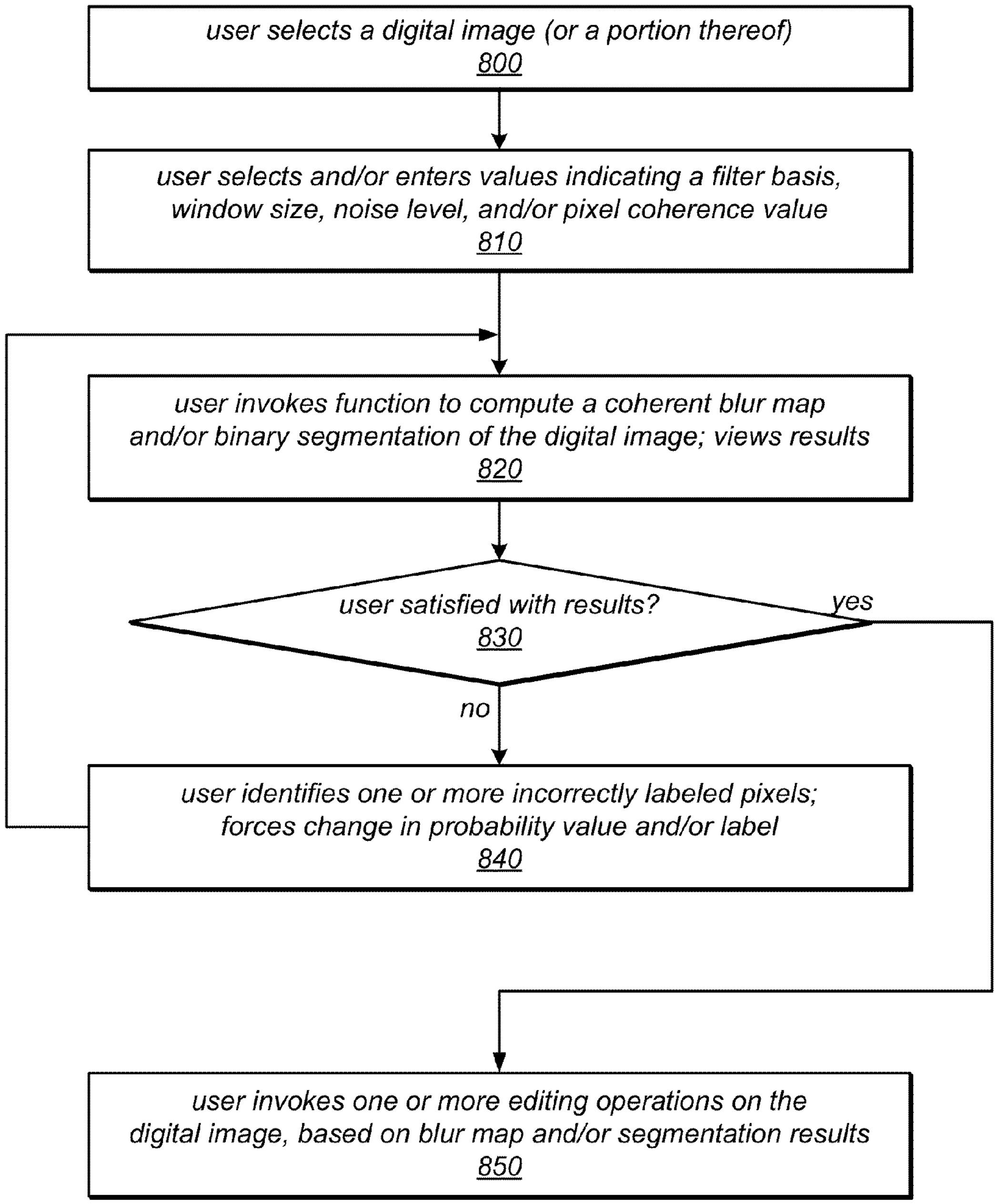
FIG. 8 is a flow diagram illustrating a method for applying the blur state classification techniques described herein to a digital image, according to some embodiments.

FIG. 8 is a flow diagram illustrating a method for applying the blur state classification techniques described herein to a digital image, according to some embodiments. In various embodiments, the operations illustrated in FIG. 8 may be implemented in software, in hardware, or in a combination of hardware and software. For example, in some embodiments, they may be performed by one or more modules of an image editing application or by one or more standalone software modules configured to perform them. As illustrated at 800, in this example, the method may include a user selecting a digital image (or portion thereof) on which to perform a blur state classification operation. The user may them select and/or enter values indicating a filter basis, window size, noise level, and/or pixel coherence value, as in 810.

As illustrated at 820, the method may include the user invoking a function to compute a coherent blur map and/or a binary segmentation of the digital image (or selected portion thereof), and viewing the results. For example, in response to the user invoking a function to compute a coherent blur map and/or a binary segmentation, the image editing application may be configured to perform any or all of the operations described herein for generating a blur classification probability matrix (e.g., based on the inputs indicated at 810) and to display the results to the user. In some embodiments, the results of a binary segmentation exercise may be displayed as a binary mask. Similarly, the results of a coherent blur mapping may be displayed graphically as an 8-bit image in which the pixels with the highest blur state values (those that are the most out of focus) appear to be white, the pixels with the lowest blur state values (those that are the most in focus) appear to be black, and other pixels appear as one of a few (or many) shades of gray, depending on their blur state values and on whether they are aggregated into a number of blur state value ranges that is less than the number of possible blue state values, in some embodiments. In other embodiments, other types of graphical or image output (e.g., graphs, plots, etc.) may be used to present the results of a coherent blur mapping exercise to a user.

If the user is not satisfied with the results, shown as the negative exit from 830, the method may include the user identifying one or more incorrectly labeled pixels (as in 840), which may force a change in the probability values and/or blur classification labels for those pixels. For example, a user interface of the image editing application may provide a pixel selection tool with which the user may select incorrectly labeled pixels in a binary segmentation mask or output image, in some embodiments. Note that in other embodiments, feedback indicating that one or more pixels were incorrectly labeled may be generated automatically in the system. In such embodiments, this feedback may be received from another module that is configured to analyze the results, rather than (or in addition to) from a user. Once the user is satisfied with the results, shown as the positive exit from 830, the method may include the user invoking one or more editing operations on the digital image (or selected portion thereof), whose performance may be dependent on the computed coherent blur map and/or the binary segmentation results, as in 850. For example, the user may specify that a given editing operation (e.g., a change in lighting, color, contrast, or other image characteristics, or a cropping, scaling, or other type of image editing operation) be directed to the "subject" of a digital image, or to the "background" in a digital image. In such embodiments, the image editing application may be configured to perform the operation on portions of the image for which the blur state has a particular value or a value within a particular range of values automatically, e.g., without the user needing to explicitly identify a "subject" or "background" portion of the image. In another example, the user may invoke a depth estimation feature to estimate the depth (i.e., the distance from the camera) of one or more elements of the digital image (e.g., objects in the image or portions thereof), based on the coherent blur mapping.

As noted above, in some embodiments, the systems described herein may be configured to provide an automatic or semi-automatic mechanism for estimating a blur map from a single input image.

In some embodiments, an imaging process that has suffered from spatially changing defocus blur and random noise may be modeled as:

$$y[n]=(k_n*x)[n]+z[n]$$

where * represents a 2D convolution operator, x and y represent the ideal sharp image and the observed blurry image (in gray level), respectively, z represents random noise, and $k_n$ represents the spatially varying blur kernel at location n. In some embodiments, it may be assumed that the noise, z, is white Gaussian noise, as follows:

$$z[n]\sim N(0,\sigma_z^2)$$

Note that in some embodiments, beside gray scale images, the model described above may also be used to describe each channel of a color image. In such embodiments, the noise level may be different for different channels.

Although the distribution of the real image content x may be difficult to model globally, in some embodiments it may be assumed that its derivative field can be locally modeled as white Gaussian noise. In other words, in a small analysis window η, the systems described herein may assume the following:

$$x^\nabla[n]=(\nabla*x)[n]\sim N(0,s_n),\ \text{for } n\in\eta$$

In this example, ∇ is a derivative operator in a particular direction (e.g., horizontal or vertical), and $s_n$ represents the local variance, which may be assumed to be piece-wise constant. The local variance may also be denoted as s for simplicity in some parts of this document.

In some embodiments, the systems described herein may also assume that blur kernel $k_n$ is constant inside η. Blur kernel $k_n$ may also be denoted as k for simplicity. In some embodiments, a localized Fourier analysis may be imposed onto a window centered at pixel n as:

$$y_i^\nabla[n]=(y^\nabla*f_i)[n]$$

where $\{f_i\}$ is a localized Fourier filter bank. This may produce a set of filtered outputs. Then, according to the paper "Analyzing Spatially-varying Blur" by Ayan Chakrabarti, the likelihood function of the observed coefficients may be derived as follows:

$$p(\{y_i^\nabla[n]\}_i \mid k)=\prod_i N(y_i^\nabla[n]\mid 0,\ s_n\sigma_{ki}^2+\sigma_{zi}^2) \qquad \text{Eq. 4}$$

where $\{\sigma_{ki}^2\}_i$ is called the blur spectrum, and is defined as follows:

$$\sigma_{ki}^2=\sum_n |k*f_i[n]|^2 \qquad \text{Eq. 5}$$

and where $\{\sigma_{zi}^2\}_i$ represents the noise spectrum, as follows:

$$\sigma_{zi}^2=\sigma_z^2\sigma_{\nabla i}^2 \text{ with } \sigma_{\nabla i}^2 \triangleq \sum_n |\nabla*f_i[n]|^2 \qquad \text{Eq. 6}$$

Note that in some cases, the noise variance may be easier to estimate than the noise spectrum. In some embodiments, the noise spectrum may be calculated from such an estimate.

Note that, in some embodiments, an estimation method based on Eq. 4 above may only rely on local image statistics (which may be noisy), and one analysis window may have several possible estimates with similar probability values. In addition, the assumption of a constant blur kernel may not hold in the case where boundaries exist between different focus planes. In some embodiments, color information from the observed image y and prior information about the image (e.g., a smoothness constraint) may improve the estimation performance and/or results.

In some embodiments, the blur map generation approach described herein may include the following two major steps:

1. Preliminary blur map estimation: This may involve estimating the possible radii for every pixel through minimizing the local likelihood function (Eq. 4) to generate a rough blur map.
2. Coherent blur map labeling: This may involve generating a smooth blur map based on the previous rough estimation, which may include incorporating color information and a smoothness prior.

Figure 9:
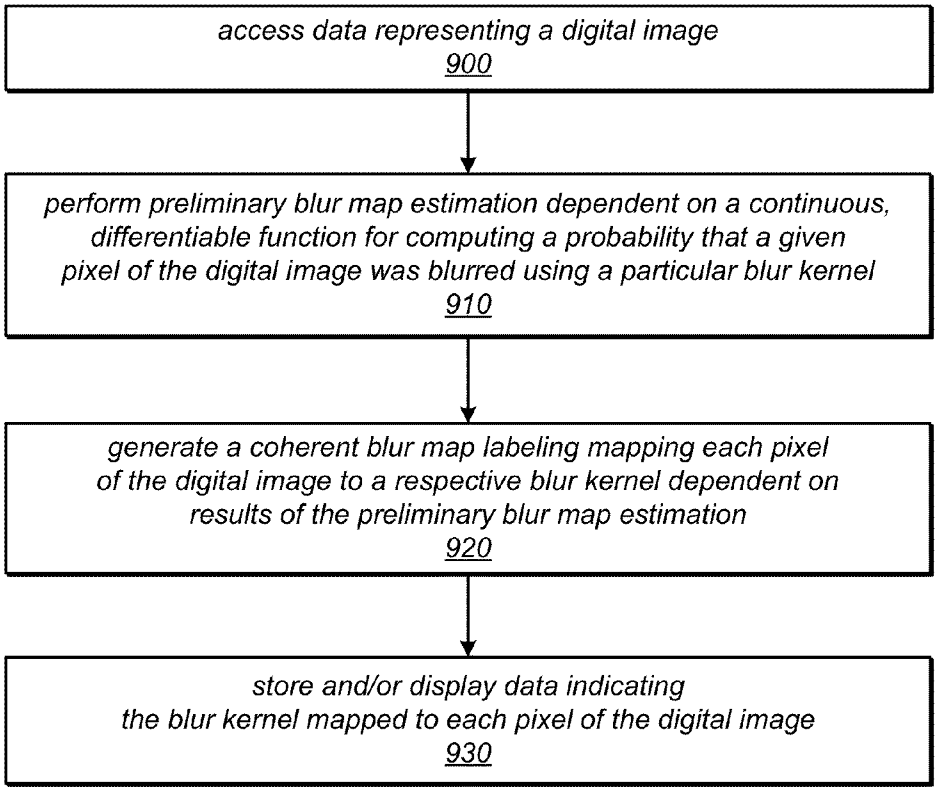
FIG. 9 is a flow diagram illustrating one embodiment of a method for estimating lens blur in a digital image.

One embodiment of a method for estimating blur in a digital image (where the blur is a spatially varying blur whose kernel is described by a single parameter) is illustrated by the flow diagram in FIG. 9. In various embodiments, the operations illustrated in FIG. 9 may be implemented in software, in hardware, or in a combination of hardware and software. For example, in some embodiments, they may be performed by one or more modules of an image editing application that provides a blur classification feature or by one or more standalone software modules configured to perform these operations. As illustrated at 900, in this example, the method may include accessing data representing a digital image. For example, data representing an input image may be obtained from data storage in response to user input selecting an existing image for editing. In some embodiments, a picture may be taken with a digital camera, or an image that already exists on film or paper may be scanned in to produce a digital image. The digital image may be uploaded to a computer where it may be accessed for editing.

As illustrated at 910, in this example, the method may include performing a preliminary blur map estimation dependent on a continuous, differentiable function for computing a probability that a given pixel of the digital image was blurred using a particular blur kernel (e.g., a two-dimensional blur kernel modeled as a disc function with a particular radius value). This preliminary blur map estimate may produce a preliminary blur mapping that includes, for each pixel of the digital image, two or more values each representing a probability that the pixel was blurred using a respective blur kernel. For example, in one embodiment, the preliminary blur mapping may identify a set of three blur kernels that are likely to have caused the blur observed at each pixel, and the corresponding probabilities that they are the correct blur kernel for the pixel. Methods for performing preliminary blur map estimation and determining a set of likely blur kernels are described in more detail below, according to some embodiments.

Once a preliminary blur mapping has been generated, the method may include generating a coherent blur map labeling for the digital image, as in 920. The coherent blur map labeling may map each pixel of the digital image to a single respective blur kernel dependent on the results of the preliminary blur map estimation. In some embodiments, generating the coherent blur map labeling may include determining the most likely collection of mappings between the pixels of the image and respective blur kernels. For example, it may include determining the collection of blur kernel label assignments that maximizes a likelihood function or minimizes a cost function over the entire image, where the set of the potential labels for each pixel is dependent on the results of the preliminary blur map estimation. As illustrated at 930, the method may include storing and/or displaying data indicating the blur kernel that is mapped to each pixel of the digital image. In some embodiments, the image editing application may store a value identifying the determined blur kernel for each pixel (e.g., a value representing or corresponding to the radius of a blur kernel modeled as a disc function) for use in subsequent image processing. For example, the method may include storing a mapping of pixels to blur states in an array indexed by pixel location, or displaying a binary image mask indicating the segmentation of the digital image into sharp and blurry regions, in various embodiments. Such stored mappings may be subsequently used to identify portions of an image on which to operate (e.g., to apply an editing operation to the subject in an image or the background of an image) or may be subsequently used in a depth estimation operation. In some embodiments, the image editing application may be configured to map the blur kernel identifier values for each pixel to a respective color value, and to display the results of the coherent blur map labeling by replacing the value of each pixel in the digital image with the color value mapped to its determined blur kernel, and/or storing data representing such a color-coded blur classification map. Examples of such displays are illustrated in FIGS. 14D, 15D, and 16B and described below.

Note that as in some previous examples, prior to operating on an input digital image to perform a preliminary blur estimation, perform a binary segmentation, and/or generate a coherent blur map labeling, the input digital image may be pre-processed (as needed) to produce modified image data. In various embodiments, this pre-processing may include converting the image data to floating point data, reversing any color correction induced by the image data format, which may include converting the image data to gray scale (as necessary), and/or generating horizontal and vertical gradients of the image (as described herein) to produce modified image data. For example, integer formats may be linearly scaled to floating point values, gamma correction that has been applied to each image channel may be reversed, or a gray scale version of the image may be computed if the image has two or more color channels. In other embodiments, the methods described herein may be improved by considering the red, green and blur channels of color image separately up to and including the point of computing the blur classification probability matrix. In such embodiments, the probability matrices for each channel may be combined when determining a classification result for a given pixel.

Note also that, as in the example illustrated in FIG. 8, the methods described herein for performing preliminary blur estimation and/or generating a coherent blur map labeling may in some embodiments be applied iteratively (with or without additional user input) until the results are satisfactory. Once the user is satisfied with the results, the user may invoke one or more editing operations on the digital image (or on a selected portion thereof), whose performance may be dependent on the preliminary blur estimation, the computed coherent blur map and/or the binary segmentation results. For example, the user may specify that a given editing operation (e.g., a change in lighting, color, contrast, or other image characteristics, or a cropping, scaling, or other type of image editing operation) be directed to the "subject" of a digital image, to the "background" in a digital image, or to portions of the image in a specified depth range (which may correspond to a particular blur range). As previously noted, the image editing application may be configured to perform the operation on portions of the image for which the blur state has a particular value or a value within a particular range of values automatically, e.g., without the user needing to explicitly identify a "subject" or "background" portion of the image. In another example, the user may invoke a depth estimation feature to estimate the depth (i.e., the distance from the camera) of one or more elements of the digital image (e.g., objects in the image or portions thereof), based on the preliminary blur estimation and/or the coherent blur mapping.

Preliminary Blur Map Estimation

As described in more detail herein, a preliminary blur map estimation operation may be used to estimate the defocus blur kernel at each position in a digital image. In some embodiments, the estimation may be based solely on local image statistics. At each pixel, the estimation may be used to identify one or more suspect kernel radii (i.e., one or more values representing the radius of a likely blur kernel) in a continuous domain and the corresponding probability value(s).

Figure 10:
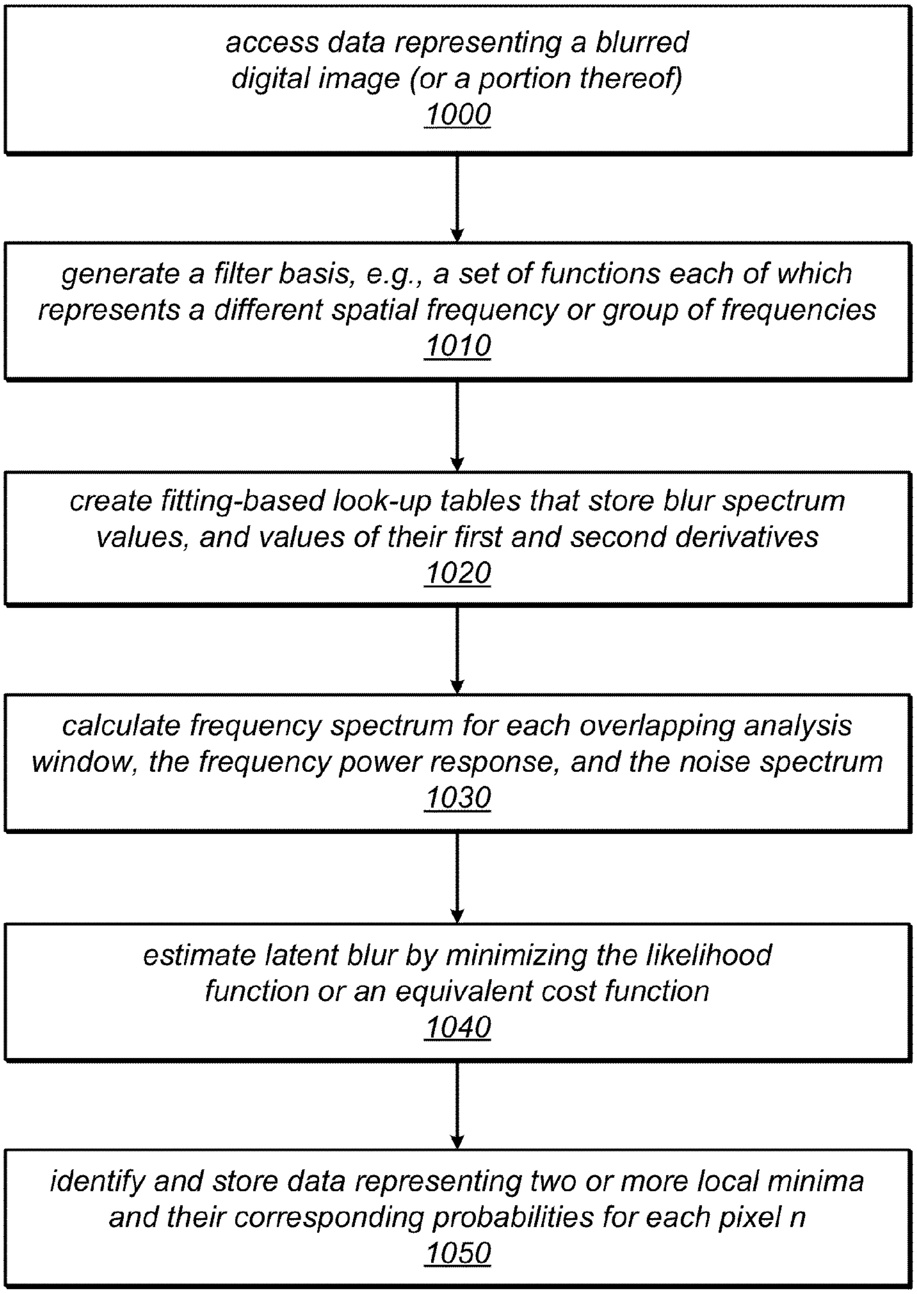
FIG. 10 is a flow diagram illustrating one embodiment of a method for performing preliminary blur map estimation, as described herein.

One embodiment of a method for performing preliminary blur map estimation is illustrated in FIG. 10, and described in more detail below. In some embodiments, blur kernels may be modeled as disc functions of radius r, and the preliminary blur map estimation may include modeling the blur spectrum as a differentiable function of radius r for blur kernels having real-valued radii. In various embodiments, the operations illustrated in FIG. 10 may be implemented in software, in hardware, or in a combination of hardware and software. For example, in some embodiments, they may be performed by one or more modules of an image editing application that provides a blur classification feature or by one or more standalone software modules configured to perform these operations. As illustrated at 1000, in this example, the method may include accessing data representing a blurred digital image (or a portion thereof). As in previous examples, data representing an input image may be obtained from data storage in response to user input selecting an existing image for editing. In some embodiments, a picture may be taken with a digital camera, or an image that already exists on film or paper may be scanned in to produce a digital image. The digital image may be uploaded to a computer where it may be accessed for editing.

As illustrated at 1010, in this example, the method may include generating a filter basis (e.g., a set of functions each of which represents a different spatial frequency or group of frequencies). The method may also include creating fitting-based look-up tables for storing blur spectrum values and values of their first and second derivatives, as in 1020, and populating those look-up tables with those values for blur kernels having different radius values. As illustrated at 1030, the method may also include calculating a frequency spectrum for each overlapping analysis window, the frequency power response, and the noise spectrum, as described in detail below.

As illustrated in FIG. 10, the method may include estimating latent blur by minimizing the likelihood function or an equivalent cost function, as in 1040, examples of which are described in detail below. The method may also include identifying and storing data identifying a set of blur kernels corresponding to the top local minima of the likelihood or cost function for each pixel n (e.g., three top minima based on image statistics and/or image content in a local image window that includes the pixel), along with their corresponding probability values, as in 1050. These techniques are described in detail below, according to some embodiments.

Generating a Filter Basis

In some embodiments, information about blur may be conveniently analyzed by the means of a frequency spectrum. In such embodiments, a localized 2D Fourier filter basis may be defined, which may include a set of functions defined over the same spatial extent as the analysis window of size M×M. Each such function may represent a different spatial frequency, or a group of related spatial frequencies. In some embodiments, the system may employ the product of a pure sinusoid with a 2D Gaussian function in the filter basis.

In one example, for the $i^{th}$ frequency $(f_h, f_v)$, the function value at position $n=(n_h,n_v)$ may be:

$$f_i[n]=w[n]\times exp((n_h f_h+n_v f_v)2\pi j) \quad \text{Eq. 7}$$

where w[n] is 2D Gaussian window function that is centered in the analysis window and whose standard deviation is about one-fourth of the diameter M of the window size. In some embodiments, this may have the advantage of tapering values down to 0 as they approach the window edge (e.g., as this is essentially a bank of Gabor filters). Otherwise, the edge of the window may appear to be a sharp edge in the image and may mask the true spectrum frequency response.

Fitting-Based Look-Up Table Calculation

In various embodiments, a defocus kernel k may be modeled in different ways. As previously noted, in some embodiments, a "disc" function may be employed, which may be described through its radius r as the only parameter: k=disc(r). However, it may be difficult to analytically get a form of the blur spectrum as a function of r, and/or a form of the likelihood in Eq. 4 as a function of r. To make the problem easier, for a given $i^{th}$ frequency, the system may in some embodiments obtain the function $\sigma_{ki}^2$ of radius r through fitting.

In one example, for a given domain for r (e.g. [0, 8]), the system may select samples equally spaced over the domain with a relatively small interval (e.g., Δr=0.01). Subsequently, a set of blur spectrum samples may be calculated using Eq. 5:

$$\{\sigma_{ki}^2(r)\}_r, r=0,0.01,0.02, \ldots ,8.$$

In one example, the following fitting function may then be selected:

$$\tilde{\sigma}_{ki}^2(r)=\exp(\alpha_p r^p+\alpha_{p+1} r^{p+1}+ \ldots \alpha_q r^q)$$

For the disc function, the blur spectrum may be likely to be close to zero in some domain locations, in which case a mild fitting error may be exaggerated when calculating the likelihood function (Eq. 4). Therefore, in some embodiments, an exponential function may be employed to promote the fitting accuracy for the small values. On the other hand, it may be easy to calculate the first and second order derivatives of this function with respect to r, and this may be useful later when optimizing the likelihood. In some embodiments, a Least Squares (LS) method may be used to obtain the fitting parameters $\{\alpha_p, \ldots, \alpha_q\}$. In one example, the fitting parameters may be set as follows: p=−7, q=15.

Note that in the minima searching operation described below, calculating the spectrum values and their derivatives directly from the above fitting function may be computationally expensive. In some embodiments, in order to reduce the cost, the system may employ look-up tables to replace the runtime computation(s). In such embodiments, each look-up table may be an array indexed by radius r. For a given $i^{th}$ basis function, three tables may be built, and these tables may store the spectrum values, and their first and second order derivatives, respectively. In some embodiments, these values may be calculated from the previously estimated fitting function. In one example, the index interval Δr between the neighboring items in a table may be set to a fine gradation, such as 0.001. Experiments have shown that performing the minima searching operation using look-up tables may take only one-tenth the time of performing the minima searching operation using a runtime computation that calculates the spectrum values and their derivatives directly from the above fitting function on the fly.

Note that, in some embodiments, it may not be necessary to create the whole table using one set of fitting parameters $\{\alpha_p, \ldots, \alpha_q\}$, since the fitting performance may be affected if a wide domain of r is required. In practice, to maintain the system accuracy, the table may be divided into short non-overlapping sections, and each section may be built using an independent set of fitting parameters. For example, one part of the table (e.g., a part of the table corresponding to values of r ranging from 0 to 1) may be built using a first fitting function (with a first set of fitting parameters), another part of the table (e.g., a part of the table corresponding to values of r ranging from 1 to 2) may be built using a second fitting function (with a second set of fitting parameters), and so on.

Note that in various embodiments, the systems described herein may employ any kernel model parameterized by a single scalar, not just the disc function. For example, such systems may employ a Gaussian shaped model featured (or indexed) by its standard deviation. In some embodiments, a new kernel model may be implemented in the system by simply replacing the look-up tables generated for one kernel model with look-up tables generated for a different kernel model.

Frequency Spectrum of Analysis Window Computation

In some embodiments, calculating the frequency spectrum for each overlapping analysis window of the input image derivative $y^\nabla$ may be equivalent to convolving the image derivative with the basis filter produced by Eq. 7, where the size of the Gaussian window w[n] is equal to the size of the analysis window. In some embodiments, this convolution process may be performed using element-wise multiplication in the 2D discrete Fourier domain.

Note that the basis response is complex, and that in the later likelihood-based estimation stage what may be needed is the power spectrum $|y_i^\nabla[n]|^2$. Therefore, in some embodiments, the method may include calculating the 2D response for the real part of the basis filter, storing the values in a temporary memory space, and then doing the same with the imaginary part of the filter. In such embodiments, the frequency power response may be generated as follows:

$$|y_i^\nabla[n]|^2=(y^\nabla*\mathrm{Real}(f_i))^2[n]+(y^\nabla*\mathrm{Imag}(f_i))^2[n]$$

Another set of variables useful for calculating the likelihood function may be those of the noise spectrum $\{\sigma_{zi}^2\}_i$, which may in some embodiments be obtained according to Eq. 6 (once the noise variance $\sigma_z^2$ is available). There are a variety of algorithms for estimating spatially constant noise level that may be employed, in different embodiments. In some embodiments, the system may employ the method described in the paper "Scale Invariance and Noise in Natural Images" presented by D. Zoran and Y. Weiss to obtain the noise variance $\sigma_z^2$ (which is assumed to be constant over the image). Note that $\sigma_z^2$ may also be estimated in other ways. Another method for estimating the noise spectrum may involve the use of a joint Maximum Likelihood algorithm with the radius r and the variance s in each local area.

Local Minima Searching

In some embodiments, given the frequency response $\{y_i^\nabla[n]\}_i$, the noise spectrum $\sigma_{zi}^2$ and the variance s of an analysis window at pixel n, the latent blur kernel k (or the kernel radius r) may be estimated by maximizing the likelihood function (Eq. 4) or (equivalently) by minimizing the following:

$$\hat{r} = \underset{r}{\operatorname{argmin}} \sum_i \left[ \frac{|y_i^\nabla[n]|^2}{s\sigma_{ki}^2(r) + \sigma_{zi}^2} + \log(s\sigma_{ki}^2(r) + \sigma_{zi}^2) \right]$$

Note that the local variance s of the latent sharp gradient image may also be unknown and may be hard to estimate. In some embodiments, as suggested in Chakrabarti's paper noted above, finding out the optimal r and s simultaneously may be done by minimizing:

$$\langle \hat{r}, \hat{s} \rangle = \underset{r,s}{\operatorname{argmin}} J(r, s)$$

where the cost function is:

$$J(r, s) = \sum_i \left[ \frac{|y_i^\nabla[n]|^2}{s\sigma_{ki}^2(r) + \sigma_{zi}^2} + \log(s\sigma_{ki}^2(r) + \sigma_{zi}^2) \right]$$

Figure 11:
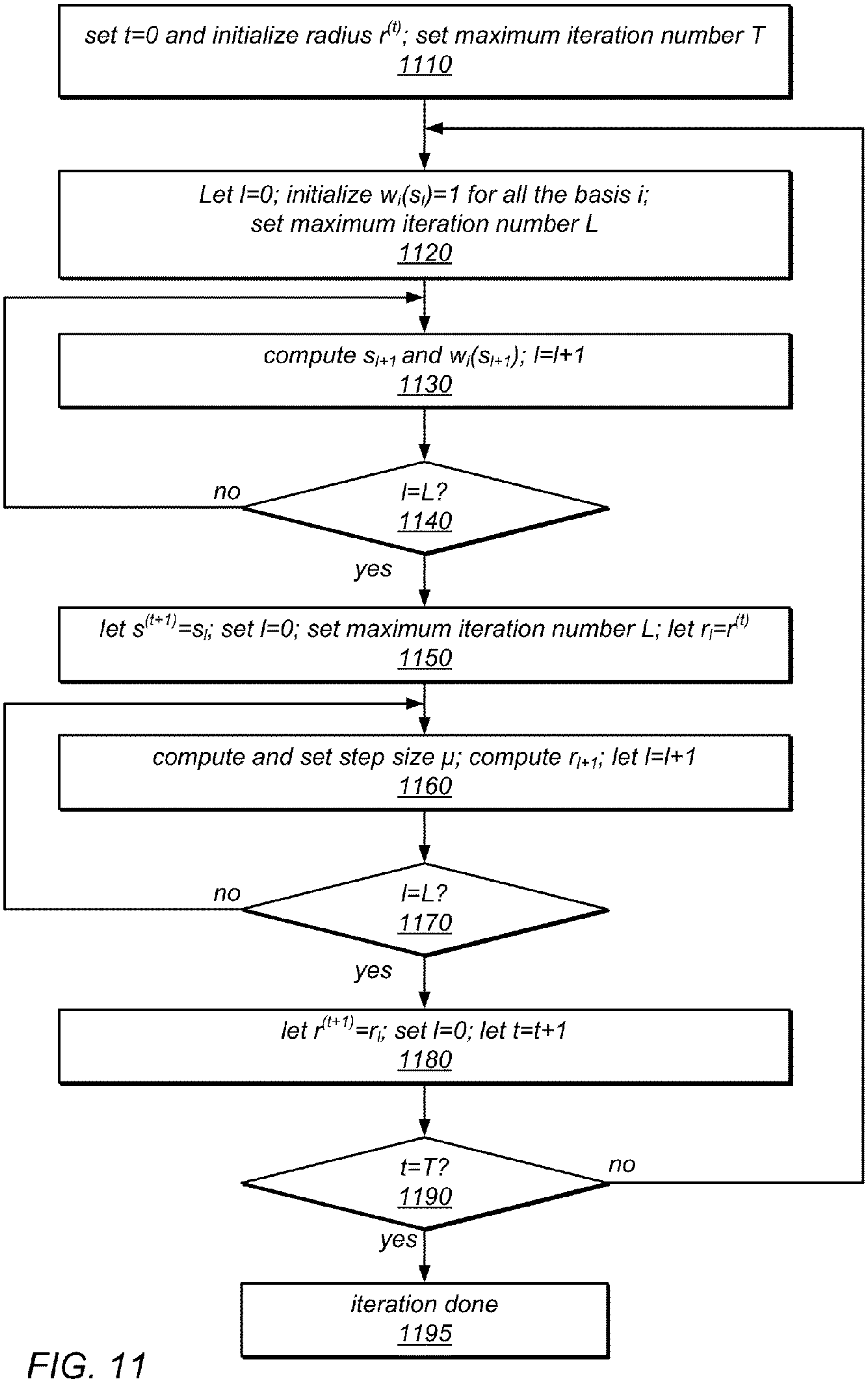
FIG. 11 is a flow diagram illustrating one embodiment of a method for performing the optimization of a cost function to estimate the latent blur kernel, as described herein.

Note that the function above is non-convex, and it is not guaranteed that the global minimum corresponds to the true s (and thus to the true radius r). However, through simulated experiments it has been found that, in most cases, the likelihood value corresponding to the latent r and s is among the local minima of the above cost function. In some embodiments, since the differentiable form of $\sigma_{ki}^2(r)$ is available, the local minima may be obtained by iteratively calculating the optimal r or s with the other variable fixed. One embodiment of a method for performing such an optimization is illustrated in FIG. 11 and described below. In various embodiments, the operations illustrated in FIG. 11 may be implemented in software, in hardware, or in a combination of hardware and software. For example, in some embodiments, they may be performed by one or more modules of an image editing application that provides a blur classification feature or by one or more standalone software modules configured to perform these operations. As illustrated in FIG. 11, the method may include the following operations:

i. Set t=0 and initialize radius $r^{(t)}$, and set the maximum iteration number T (is in 1110).

ii. Find the optimal $$s^{(t+1)} = \underset{s}{\operatorname{argmin}} J(r^{(t)}, s).$$

In some embodiments, this may be achieved through fixed point iterations, as follows:

a) Let l=0; initialize $w_1(s_1)=1$ for all the basis i; and set the maximum iteration number L (as in 1120).

b) Compute $$s_{l+1} = \left( \sum_i w_i(s_l) \right)^{-1} \sum_i w_i(s_l) \frac{|y_i^\nabla[n]|^2 - \sigma_{zi}^2}{\sigma_{ki}^2(r^{(t)})}$$

and c) compute $$w_i(s_{l+1}) = \left( 1 + \frac{\sigma_{zi}^2}{s_{l+1}\sigma_{ki}^2(r^{(t)})} \right)^2, \text{ then}$$

d) increment the iteration number l=l+1 (as in 1130). If the stopping criterion is met e.g., if (l=L), shown as the positive exit from 1140, let $s^{(t+1)}=s_l$ and go to step iii below (beginning with the operations illustrated at 1150). Otherwise go to step ii. b) above. This is illustrated in FIG. 11 as the feedback from the negative exit of 1140 to 1130.

iii. Find the optimal $$r^{t+1} = \underset{r}{\operatorname{argmin}} J(r, s^{(t+1)}).$$

In some embodiments, this may be done through a gradient descent method, as follows:

a) Set l=0, the maximum iteration number L, and let $r_1=r^{(t)}$ (as in 1150).

b) Compute and set the step size $$\frac{\mu = 1}{\left( \frac{d^2 J(r, s^{t+1})}{dr^2} \Big|_{r=r_l} \right)},$$

and c) compute $$r_{l+1} = r_l - \mu \frac{dJ(r, s^{(t+1)})}{dr} \Big|_{r=r_l},$$

then d) increment the iteration number l=l+1 (as in 1160). If the stopping criterion is met, e.g., if (l=L), shown as the positive exit from 1170, let $r^{(t+1)}=r_l$ and go to step iv. below (shown as 1180). Otherwise go to step iii. b) above. This is illustrated in FIG. 11 as the feedback from the negative exit of 1170 to 1160.

iv. Let t=t+1 (as in 1180). If t=T, shown as the positive exit from 1190, end the iteration (as in 1195). Otherwise, shown as the negative exit from 1190, go to step ii (shown as the feedback from 1190 to 1120).

Note that in the steps ii-b), ii-c), iii-b) and iii-c), look-up tables generated as described above may be used for obtaining the values of $\sigma_{ki}^2(r)$ and/or its first and second order derivatives, in some embodiments.

Note also that that the minimum searching process described above may be sensitive to the initial guess of radius $r^{(0)}$. In some embodiments, to cover most local minima, the method may include generating a set of initial values. For example, in some embodiments, the method may include choosing the set of integers 1, 2, . . . , 8 as a set of initial guesses for radius $r^{(0)}$, and running the algorithm described above for each of these values. In some embodiments, this approach may allow most (if not all) local minima over the initially-selected domain (i.e., the domain [0,8], in this example) to be captured.

In some embodiments, after performing the searching step described above, only the top 3 minima $\{r_1, r_2, r_3\}$ and their corresponding probability $\{p_1, p_2, p_3\}$ may be stored for each pixel n. This data may be provided to the labeling stage in order to generate the data term.

Generating a Coherent Blur Map

In some embodiments, a coherent blur map may be generated based on the preliminary estimation and other information about the image (e.g. smoothness). In some embodiments, this may be achieved by minimizing the cost of an energy function, such the one shown in Eq. 8 below.

$$E(\Phi)=\Sigma_n\omega_n D_n(r_n)+\Sigma_{(n,m)\in N}\lambda_{n,m}V_{n,m}(r_n,r_m) \quad \text{Eq. 8}$$

In this example, $\Phi=\{r_n\}$ denotes a solution over all pixel locations n. In Eq. 8, N represents the set of pairs of neighboring pixels, $D_n(r_n)$ represents the cost of assigning $r_n$ to pixel n, and $V_{n,m}(r_n,r_m)$ represents the cost of assigning values $r_n$ and $r_m$ to neighboring pixels n and m, respectively. In some embodiments, the single pixel cost $D_n(r_n)$ may be derived from the previous blur kernel likelihood estimation, and may be referred to as the data term. In this example, the weighting parameter $\omega_n$ represents the confidence level of the preliminary estimation at pixel n. In this example, the pair-wise pixel cost $V_{n,m}(r_n,r_m)$ may be used to encourage neighboring pixels to have similar labels, resulting in smoother outputs, and it may be referred to as the smoothness term. In this example, the smoothness parameter $\lambda_{n,m}$ may control the strength of the smoothness constraint (i.e., the amount that it influences the result). As described above in a previous discussion of the smoothness term and smoothness parameter, in some embodiments, the smoothness parameter may be adaptive to local image content. For example, the value of the smoothness parameter may decrease if the color distance between pixels n and m is large, which may protect the boundaries between objects that lie in different focus planes.

Note that the optimization of the cost function (Eq. 8) is not trivial, because the data term is highly non-convex. in some embodiments, in order to simplify this problem without introducing too much error, the method may include discretizing the radius value r and changing the problem into a labeling problem, as described below.

In some embodiments, in the labeling problem, the labels may represent the values of the radii r, and these values may be constrained to a finite number of possible values. For example, in one embodiment, r may be chosen from the set $\psi=\{0, 0.1, 0.2, \ldots, 7.9, 8\}$. In some embodiments, this labeling problem may be solved by using an existing energy minimization technique such as α-expansion or belief propagation. An explanation of the α-expansion algorithm is included herein.

Figure 12:
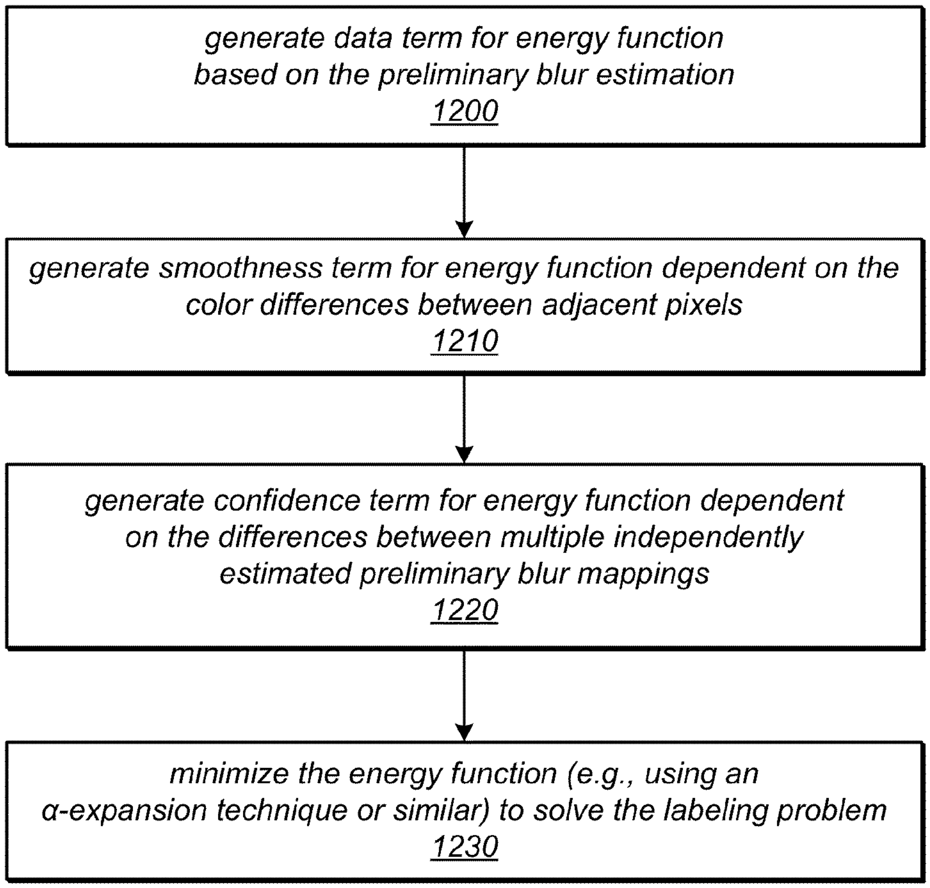
FIG. 12 is a flow diagram illustrating one embodiment of a method for generating a coherent blur map based on preliminary blur estimation and other information about the image.
Figure 13:
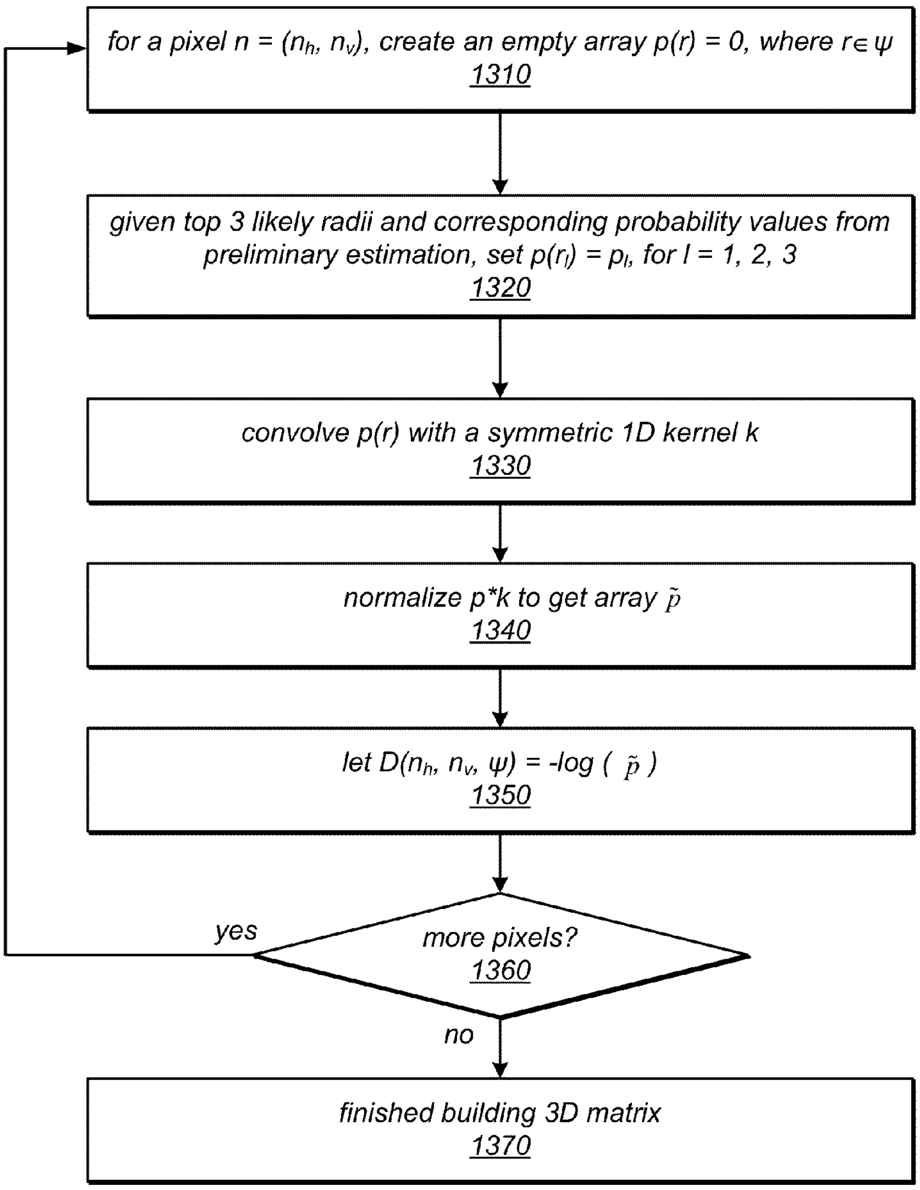
FIG. 13 is a flow diagram illustrating one embodiment of a method for building a 3D matrix for a data term, as described herein.

One embodiment of a method for generating a coherent blur map based on a preliminary blur estimation and other information about a digital image (e.g., image content and/or smoothness) is illustrated by the flow diagram in FIG. 12 and described in more detail below. In various embodiments, the operations illustrated in FIG. 12 may be implemented in software, in hardware, or in a combination of hardware and software. For example, in some embodiments, they may be performed by one or more modules of an image editing application that provides a blur classification feature or by one or more standalone software modules configured to perform these operations. As illustrated in this example, the method may include generating a data term for an energy function based on the preliminary blur estimation (as in 1200). In some embodiments, generating the data term may include creating a three-dimensional (3D) matrix of probability data based on the results of the preliminary blur estimation. One embodiment of a method for generating such a matrix is illustrated in FIG. 13 and described in detail below.

As illustrated at 1210, in this example, a method for generating a coherent blur map may also include generating a smoothness term for the energy function dependent on the image content (e.g., dependent on the color differences between adjacent pixels in the digital image). A description of the definition and use of such a smoothness term is described in detail below, according to some embodiments. As illustrated in FIG. 12, the method may also include generating a confidence term for energy function that is dependent on the differences between multiple independently estimated preliminary blur mappings, as in 1220. One such confidence term is described in detail below. The method may also include minimizing the energy function (e.g., using an α-expansion technique or any other suitable minimization technique) to solve the coherent blur map labeling problem, as in 1230.

Data Term

In some embodiments, the data term may reflect the fidelity to the preliminary likelihood estimation. However, using the probability values derived directly from Eq. 4 in generating the data term may yield less than desirable results. For example, the probability values derived directly from Eq. 4 may not give sufficient preference to the top local minima. In some embodiments, in order to alleviate this concern and to cause the data term to more reliably favor the top local minima, the method may include creating a 3D matrix $D(n_h, n_v, r)$ from the preliminary estimation. One embodiment of a method for building such a 3D matrix is illustrated in FIG. 13 and described below. In various embodiments, the operations illustrated in FIG. 13 may be implemented in software, in hardware, or in a combination of hardware and software. For example, in some embodiments, they may be performed by one or more modules of an image editing application that provides a blur classification feature or by one or more standalone software modules configured to perform these operations. As illustrated in FIG. 13, the method may include the following operations:

i. For each pixel $n=(n_h,n_v)$, create an empty array $p(r)=0$, where $r\in\psi$ (as in 1310).

ii. Given the top 3 likely radii $\{r_1,r_2,r_3\}$ and the corresponding probability value $\{p_1, p_2, p_3\}$ from the preliminary estimation for pixel n, set $p(r)=p_1$, l=1, 2, 3 (as in 1320).

iii. Convolve p (r) with a symmetric 1D kernel κ (as in 1330). For example, in some embodiments, the kernel may be set according to the following: $\kappa=[10^{-20},10^{-12},10^{-7},10^{-3},10^{-1},1,10^{-1},10^{-3},10^{-7},10^{-12},10^{-20}]$. Then, normalize $p*\kappa$ to get an array $\tilde{p}$ (as in 1340).

iv. Let $D(n_h,n_v,\omega)=-\log(\tilde{p})$ (as in 1350).

v. If there are other pixels for which to generate data (shown as the positive exit from 1360), go to the next pixel, and start from step i. This is illustrated in FIG. 13 by the feedback from 1360 to 1310. Once all of the pixels have been considered, shown as the negative exit from 1360, the building of the 3D matrix is complete (as shown at 1370).

In some embodiments (e.g., in embodiments in which the labeling problem only considers a finite set of labels), a 3D matrix $D(n_h,n_v,r)$ as described above may sufficiently describe the data function $D_n(r_n)$.

Note that in the preliminary estimation stage, estimates may be obtained from multiple derivative fields (e.g. estimates based on horizontal and vertical derivative fields). In some embodiments, a single estimate may be sufficient to generate a reasonable output. However, in other embodiments, multiple independent estimates may be used to indicate a confidence level for the preliminary estimate for each pixel location n. In general, for a pixel at location n, when the two independent estimates (i.e., the horizontal and vertical estimates) are relatively close to each other, the confidence level may be relatively high. Conversely, when the two independent estimates are not close to each other, the confidence level may be relatively low.

In some embodiments, the confidence level $\omega_n$ may be defined as:

$$\omega_n = \exp\left(\frac{(r_1^h - r_1^v)^2}{-2\sigma_c^2}\right)$$

where $\sigma_c^2$ is a tuning parameter that controls the sensitivity of the confidence level.

Smoothness Term

In some embodiments, a simple V function (i.e., smoothness term) may be employed for creating a coherent blur map. For example, following function may be used:

$$V_{n,m}(r_n,r_m)=|r_n-r_m|$$

Using this function, the bigger the difference is between the radii, the larger the penalty becomes, and the cost of setting adjacent pixels to the same radius value is zero. The use of this simple smoothness term may in some embodiments reduce the noise effect in the data term, correcting errors caused in the preliminary estimation stage.

In some cases, the simple smoothness constraint shown above may blur the boundaries between different focus planes. In some embodiments, to encourage the discontinuity of the blur map to fall along object edges, a smoothness parameter may be applied, which may be defined as follows:

$$\lambda_{n,m} = \lambda_0 \exp\left(\frac{\|I_n - I_m\|^2}{-2\sigma_\lambda^2}\right)$$

Note that, in this example, $\lambda_{n,m}=\lambda_{m,n}$. In this example (as in the previous discussion of the smoothness parameter), $\lambda_0$ may represent a global parameter that controls the overall strength of the smoothness term, and $I_n$ may represent a 3×1 vector containing the RGB values of pixel n in the input color image. In this example, $\|I_n-I_m\|^2$ may measure the color difference between n and m. In some embodiments, the color may be an important and effective clue for distinguishing between objects, since in many cases different objects have different colors. In this example, $\sigma_\lambda^2$ may represent a tuning parameter for the smoothness parameter. In some embodiments, for a given pixel of interest n, only the 8 surrounding pixels may be considered for the smoothness term. In some embodiments, the smoothness term may also incorporate a neighborhood with a support larger than 2 pixels.

Note that this formulation for the smoothness parameter is similar to that defined by the formulation for the smoothness term described earlier as:

$$V_{pq}(0,1) = V_{pq}(1,0) = \lambda \exp\left(-\frac{\|I(p) - I(q)\|^2}{2\sigma^2}\right)\frac{1}{\|p-q\|}$$

In some embodiments, an alpha expansion technique (such as the α-expansion algorithm described earlier) may be applied to solve a two-label problem by simply initializing all labels to the maximum label value of 1, and then running a single α-expansion step to expand the label 0. In such embodiments, only one minimum graph cut problem may need to be solved, and the algorithm may be guaranteed to find the labeling Φ* that yields a global minimum of the energy E(Φ). By contrast, only a strong local minimum may be guaranteed for an α-expansion algorithm applied to a labeling problem with more than two labels. As described above, however, a more direct minimum graph cut problem than that employed in the α-expansion formulation may be constructed for solving a two-label problem, and the solution to this problem may also guarantee a global minimum energy.

Experimental Examples

Figure 14A:
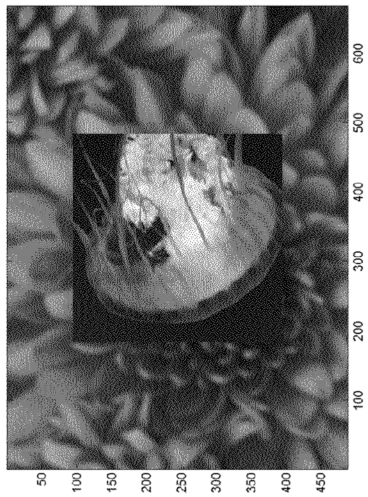
FIGS. 14A-14D, 15A-15D, and 16A-16B illustrate the application of the techniques described herein for blur map generation on two simulated images and one real image, respectively, according to one embodiment.
Figure 14B:
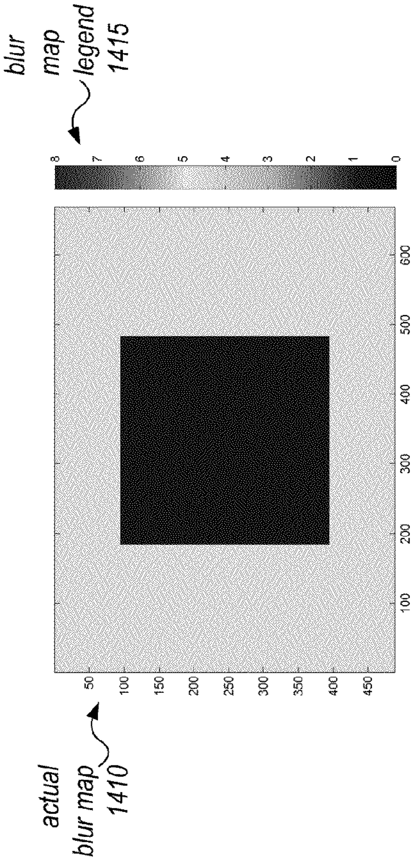
Figure 14C:
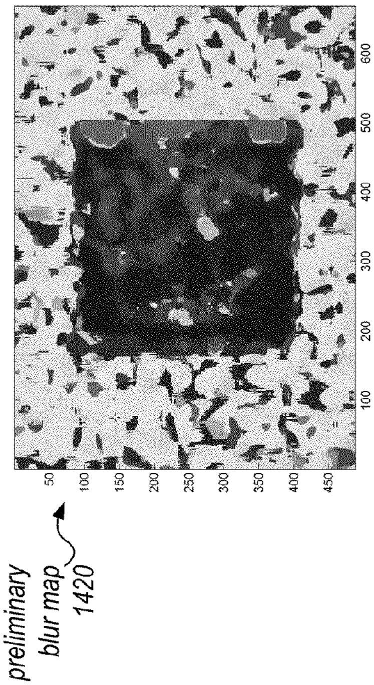
Figure 14D:
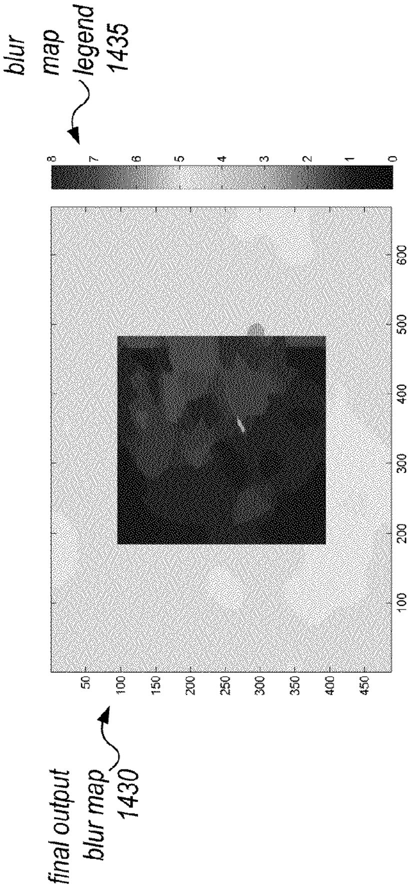
Figure 15A:
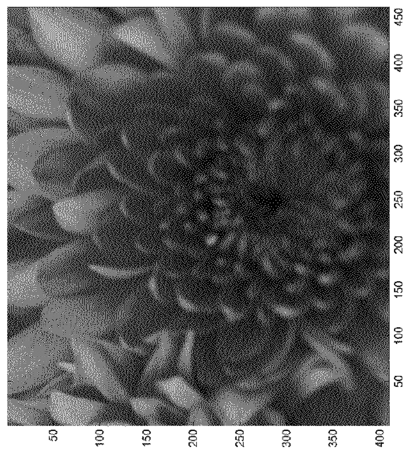
Figure 15B:
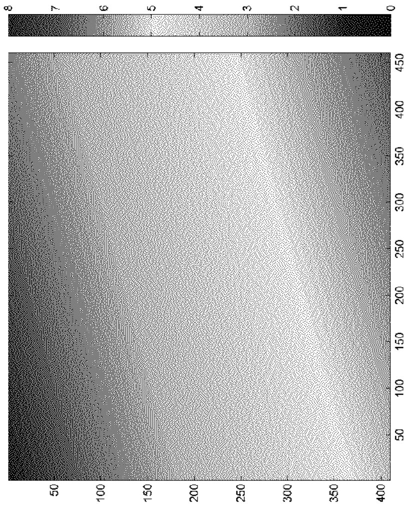
Figure 15C:
Figure 15D:
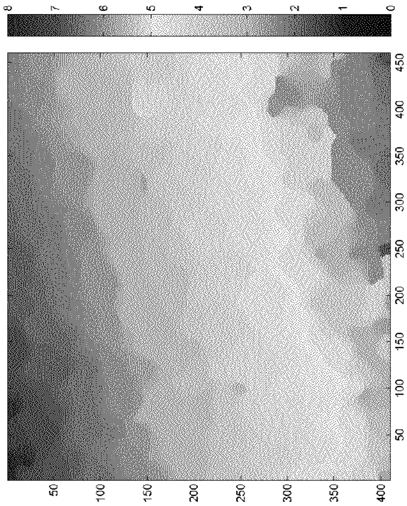
Figure 16A:
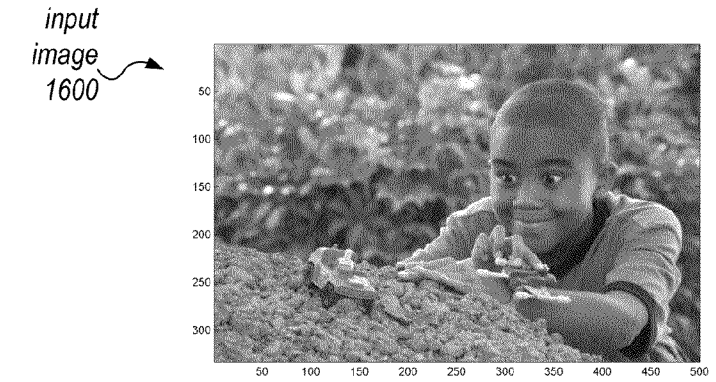
Figure 16B:
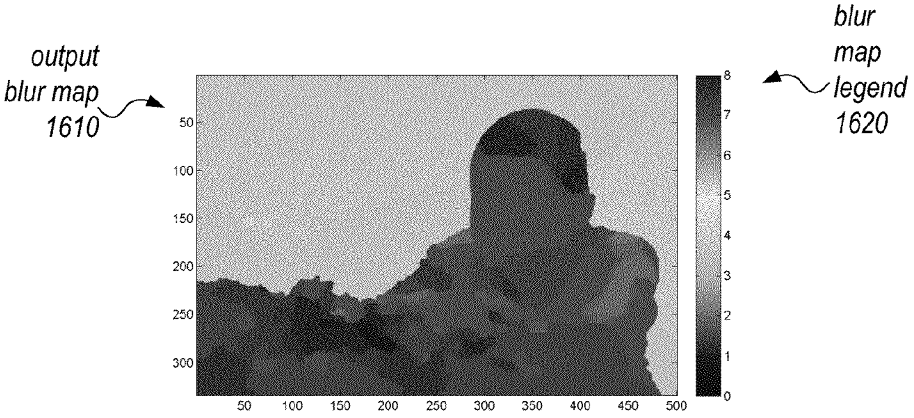

Two experiments that employ the systems and techniques described herein for blur map generation involving simulated images and one experiment involving a real image are illustrated in FIGS. 14A-14D, 15A-15D, and 16A-16B. In each of these experiments, the illustrated blur maps represent different blur kernel radius values using different colors, according to a corresponding blur map legend. In these examples, each of the blur map legends maps different colors to radius values in the range [0,8]. In the first experiment, FIG. 14A illustrates a simulated input image 1400 that includes an in-focus subject and out-of-focus background. More specifically, the portion of the image inside the square in the center of input image 1400 is completely un-blurred, and the background of input image 1400 has been blurred by a disc kernel having a radius r=5. In this example, input image 1400 was generated by superimposing a small, sharp image over larger image that was blurred. In this example, Gaussian noise with $\sigma_z^2=1\times10^{-6}$ was also added to the simulated input image 1400 shown in FIG. 14A. In this example, FIG. 14B illustrates the actual blur map 1410 for input image 1400 in FIG. 14A, according to blur map legend 1415. In other words, the color illustrated at each pixel in FIG. 14B represents the true blur kernel values for that pixel (in this case, either 0 or 5).

FIG. 14C illustrates a preliminary blur map 1420 that includes the highest probability blur kernel radius value at each pixel, as determined from the preliminary estimation step described herein (e.g., the highest value selected from a set of three blur kernels that were determined to be most likely to have caused the blur observed at each pixel). In this example, the blur kernel values in most regions of FIG. 14C were correctly estimated, but blur map 1420 still contains a certain amount of noise. Note that in FIG. 14C, which uses the preliminary estimation only, the boundary between the foreground and the background portions of the image does not match the boundary between these portions of input image 1400. However, as illustrated by the final output blur map (shown as 1430 in FIG. 14D), the addition of the smoothness constraint in Eq. 8 corrects these errors, and also shifts the boundary to the correct position. In this example, FIG. 14D illustrates a final estimated output blur map 1430 for input image 1400 in FIG. 14A, according to blur map legend 1435, which again maps color values to blur kernel radius values in the range [0,8]. In this experiment, the final estimated output blur map 1430 was computed automatically, i.e., without any user intervention. In this example, the algorithm parameters were set as follows: window size M=41, noise variance $\sigma_z^2=1\times10^{-6}$, global smoothness parameter $\lambda_0=20$, $\sigma_\lambda^2=0.01$.

The second experiment (shown in FIGS. 15A-15D) illustrates that the techniques described herein also work well in cases in which the blur kernel radius values gradually change over the image space. For example, FIG. 15A illustrates a simulated input image 1500 that was generated with a gradually changing defocus blur. In other words, input image 1500 was generated by applying a gradually changing defocus blur to a sharp image (i.e., one without any blur). FIG. 15B illustrates the true blur map 1510 for input image 1500 in FIG. 15A, according to blur map legend 1515. As illustrated in FIG. 15B, the actual amount of blur in the image varies from its lowest point near the top left corner to its highest point near the bottom right corner. In this example, FIG. 15C illustrates a preliminary estimated blur map 1520 that includes the highest probability blur kernel radius value at every pixel, as determined from the preliminary estimation step described herein. Finally, FIG. 15D illustrates a final estimated output blur map 1530 for input image 1400 in FIG. 15A, according to blur map legend 1535, which again maps color values to blur kernel radius values in the range [0,8]. As illustrated in this example, the techniques described herein may produce a coherent blur map that represents the actual blur map well even when the blur changes gradually over the entire image. As in the previous example, the final estimated output blur map 1530 was computed automatically, i.e., without any user intervention. In this example, the algorithm parameters were set as follows: window size M=41, noise variance $\sigma_z^2=1\times10^{-6}$, global smoothness parameter $\lambda_0=10$, $\sigma_\lambda^2=0.01$.

A third experiment (one involving a real image test) is illustrated in FIGS. 16A-16B. Again, the techniques described herein successfully produced a reasonable blur map for the input image. In this example, FIG. 16A illustrates an input image 1600 that includes an in-focus subject and an out-of-focus background. FIG. 16B illustrates a final estimated output blur map 1610 for input image 1600 in FIG. 16A, according to blur map legend 1620. As in the previous examples, the final estimated output blur map 1610 was computed automatically, i.e., without any user intervention. In this example, the algorithm parameters were set as follows: window size M=21, noise variance $\sigma_z^2=1\times10^{-6}$, global smoothness parameter $\lambda_0=20$, $\sigma_\lambda^2=0.01$.

In some previous blur estimation approaches, for each analysis window, the most likely blur kernel is estimated in a discrete domain. Using such techniques, a blur kernel set may be defined containing disc kernels whose radii are integers (in units of pixels, and in a range from 0 to about 10, for example), the likelihood function may be calculated for each of these candidate kernels, and the one with the highest probability may be selected. However, this approach cannot handle kernels that have real-valued radii. By contrast, the approach described herein may in some embodiments estimate the blur kernel radii in a continuous domain. For example, the approach described herein may represent the blur spectrum as a differentiable function of radius r, so that the optimal radius can be estimated by optimizing the likelihood function through a gradient descent algorithm. In addition, the spectrum function over r may be generated through a polynomial-based fitting process.

Another difference between the techniques described herein and some previous blur estimation techniques is that, in some embodiments, after fitting, the method may include generating three look-up tables, which may store values for the spectrum and for its first and second order derivatives, respectively. These tables may then be used in the likelihood optimization process. In some embodiments, the generation and use of the look-up tables may significantly reduce the computational costs of a given blur estimation exercise.

Unlike in previous approaches in which a coherent blur map may be generated by minimizing an energy function that includes a data term, a smoothness term, and a fixed smoothness parameter $\lambda$ (which may be used to adjust the smoothness strength of the output blur map), the approach described herein may, in some embodiments, include a smoothness parameter $\lambda$ that is adaptive to local image content. For example, $\lambda$ may be dependent on the color difference between neighboring pixels. In experiments (such as the experiment illustrated in FIGS. 15A-15D, this has been shown to improve the estimation accuracy in the boundary regions between objects in different focal planes.

As described above, in some embodiments, a confidence map may be introduced into the data term in the energy function that serves to weight the data term according to the local confidence of the previously estimated likelihood. In such embodiments, the confidence value for each position may be measured by the distance between the most likely radii separately estimated from the horizontal and vertical derivatives.

Note that while numerous examples of the techniques disclosed herein are described in terms of families of blur kernels having different radii, in general, these techniques may be applied to estimate spatially varying defocus blur in an image based on a family of blur kernels that is defined in terms of another single parameter. For example, they may be applied to estimating defocus blur in an image due to various 2D isotropic Gaussian blur kernels in a family of blur kernels parameterized by a standard deviation ($\sigma$), or various blur kernels in another parameterized family of blur kernels.

Example Implementations

Figure 17:
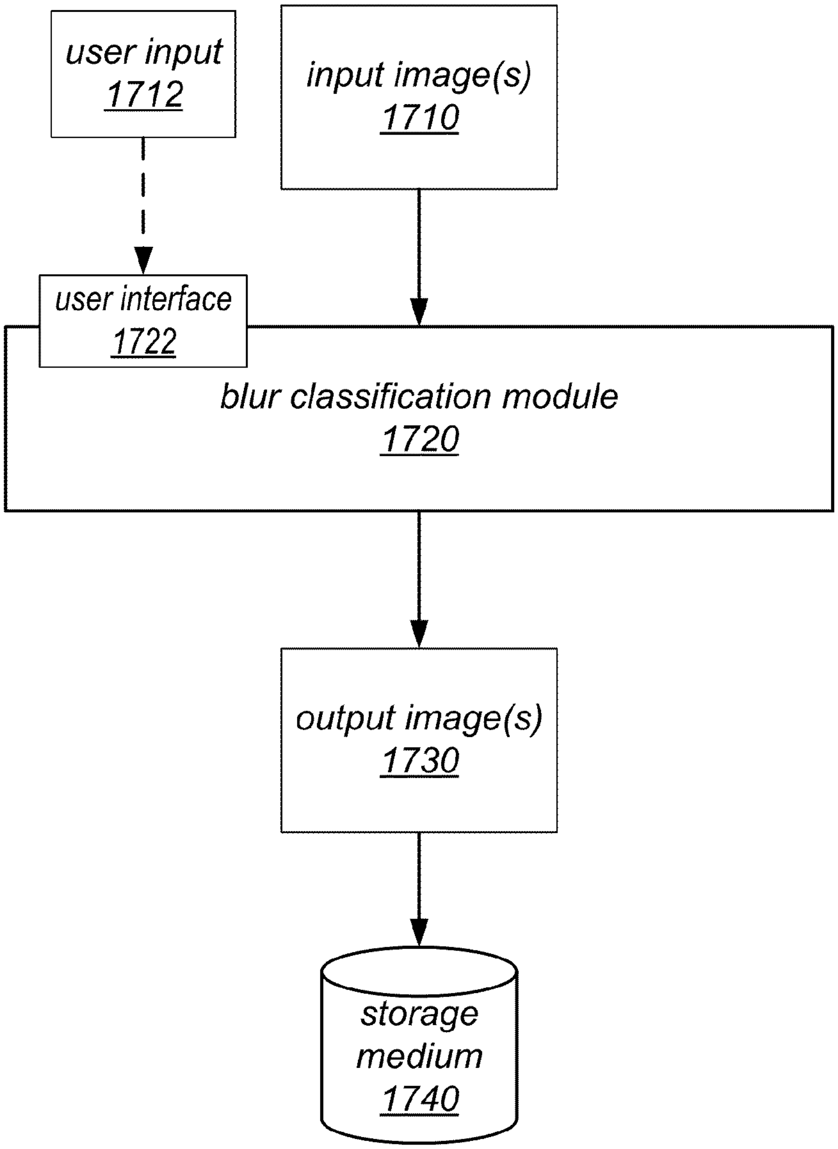
FIG. 17 is a block diagram illustrating various modules that may implement the blur state classification and blur map generation techniques described herein, according to some embodiments.
Figure 18:
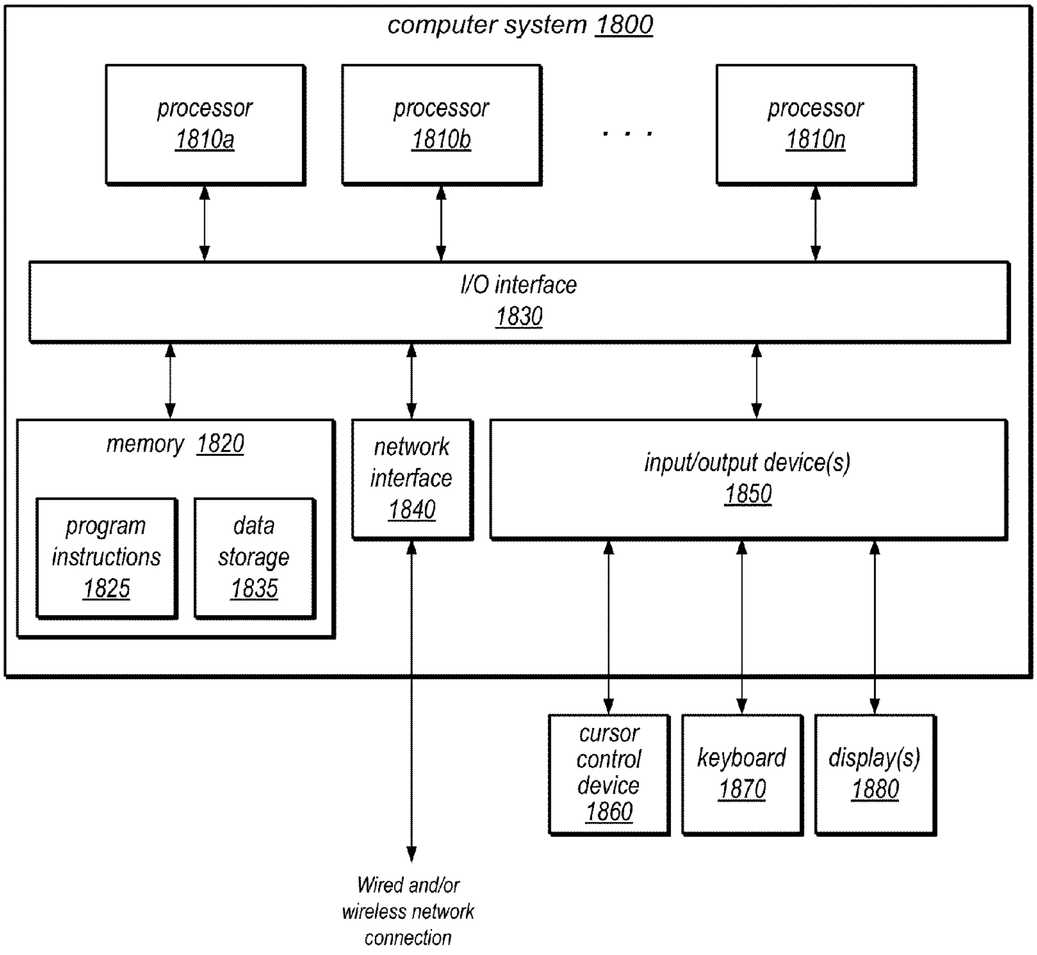
FIG. 18 illustrates a computer system that may be used to perform blur state classification of the pixels in a digital image and/or generation of a coherent blur map for a digital image, according to some embodiments.

FIG. 17 is a block diagram illustrating various modules that may implement the blur state classification and/or coherent blur map generation techniques described herein, according to some embodiments. For example, FIG. 17 illustrates a blur classification module 1720 that may implement one or more of the image editing techniques and tools described herein. Module 1720 may, for example, implement one or more of: input image pre-processing, image window pre-processing (e.g., computing the power frequency spectrum of image windows), blur kernel pre-processing (e.g., computing the frequency power spectrum for each blur kernel), blur classification probability matrix generation, preliminary blur map estimation, coherent blur map generation, binary segmentation, and/or depth estimation. FIG. 18 illustrates an example computer system on which embodiments of module 1720 may be implemented. Module 1720 may receive as input one or more digital images 1710. Example input images are shown in FIGS. 14A, 15A, and 16A. Module 1720 may receive user input 1712 specifying values for one or more parameter used by these image editing tools. Module 1720 may then edit the input image(s) 1710, according to user input 1712 received via user interface 1722, e.g., producing an output image representing a coherent blur map (such as the output blur maps illustrated in FIGS. 14D, 15D, and 16B), and/or an image representing the results of a binary segmentation of the image into blurry and sharp regions (such as the binary image mask illustrated in FIG. 7B). Module 1720 may generate this output as one or more modified images 1730. Output image(s) 1730 may, for example, be stored to a storage medium 1740, such as system memory, a disk drive, DVD, CD, etc.

In some embodiments, module 1720 may provide a user interface 1722 via which a user may interact with the module 1720, for example to activate various tools to perform the computations and image editing operations described herein, and/or to select or enter parameter values to be used in those computations. In some embodiments, the user interface may provide user interface elements whereby the user may select blur classification parameter values including, but not limited to, the window size, the noise level, and/or the pixel coherence (or smoothness). In some embodiments, the user interface may provide user interface elements whereby the user may select values for a set of blur kernel radii, an edge contrast parameter, an in-focus radius parameter, or other parameters used in generating a coherent blur map or binary segmentation, while in other embodiments, some or all of these values may be defined as default values (e.g., built into a blur classification module), which may or may not be overridden by a user. In some embodiments, user interface elements may be used to select a filter basis, to invoke the generation of a coherent blur map and/or the performance of a binary segmentation, or to invoke a depth estimation tool or another image editing operation that employs the results of the blur classification and/or coherent blur map generation techniques described herein. In some embodiments, the user interface may provide user interface elements whereby the user may specify whether the tools should apply an iterative or direct approach to computations described herein, and/or to select, enable, or disable one or more of the alternative approaches described herein for performing various ones of the computations described. In some embodiments, a user interface of an image editing application may provide a pixel selection tool with which a user may select incorrectly labeled pixels in a binary segmentation mask or output image.

In various embodiments, the blur classification module described herein may include and/or call other modules to perform various functions of the blur classification module. For example, different modules or sub-modules may be configured to perform input image pre-processing, image window pre-processing (e.g., computing the power frequency spectrum of image windows), blur kernel pre-processing (e.g., computing the frequency power spectrum for each blur kernel), blur classification probability matrix generation, preliminary blur map estimation, coherent blur map generation, binary segmentation, and/or depth estimation. Blur classification module 1720 illustrated in FIG. 17 may include any or all of these sub-modules, or they may be distinct from, and called by, blur classification module 1720, in different embodiments.

Some embodiments of the systems described herein may include a means for pre-processing a digital image for input to a blur classification exercise. For example, an input image pre-processing module may access data representing a digital image and may convert the image data to a floating point format, reverse any corrections induced by the original image data format, and/or convert the image to grayscale, as described herein. The input image pre-processing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform accessing data representing a digital image, converting the image data to a floating point format, reversing any corrections induced by the original image data format, and/or converting the image to grayscale, as described herein. Other embodiments of the input image pre-processing module may be at least partially implemented by hardware circuitry and/or firmware stored, for example, in a non-volatile memory.

Some embodiments of the systems described herein may include a means for pre-processing a window of a digital image for use in a blur classification exercise. For example, an image window pre-processing module may access pre-processed image data and may compute the power frequency spectrum of image windows of selected types and sizes centered at each pixel of the image, as described herein. The image window pre-processing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform accessing pre-processed image data, and computing the power frequency spectrum of image windows of selected types and sizes centered at each pixel of the image, as described herein. Other embodiments of the image window pre-processing module may be at least partially implemented by hardware circuitry and/or firmware stored, for example, in a non-volatile memory.

Some embodiments of the systems described herein may include a means for pre-processing a set of blur kernels for use in a blur classification exercise. For example, a blur kernel pre-processing module may receive input indicating a set of likely blur kernels, may compute the frequency power spectrum for each blur kernel in the set, and may store the results in an array indexed by filter basis elements and blur kernel identifiers, as described herein. The blur kernel pre-processing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input indicating a set of likely blur kernels, computing the frequency power spectrum for each blur kernel in the set, and storing the results in an array indexed by filter basis elements and blur kernel identifiers, as described herein. Other embodiments of the blur kernel pre-processing module may be at least partially implemented by hardware circuitry and/or firmware stored, for example, in a non-volatile memory.

Some embodiments of the systems described herein may include a means for generating a probability matrix whose values represent the likelihood that particular pixels of a digital image were blurred using particular blur kernels. For example, a blur classification probability matrix generation module may pre-process one or more filters, solve for a standard distribution function that maximizes the probability that elements in the blurred power spectrum came from normal distributions, and (for each pixel and each blur kernel) iterates over all filter elements to compute the probability that the pixel was blurred with the blur kernel and stores the results in a probability matrix, as described herein. The blur classification probability matrix generation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform pre-processing one or more filters, solving for a standard distribution function that maximizes the probability that elements in the blurred power spectrum came from normal distributions, and (for each pixel and each blur kernel) iterating over all filter elements to compute the probability that the pixel was blurred with the blur kernel and storing the results in a probability matrix, as described herein. Other embodiments of the blur classification probability matrix generation module may be at least partially implemented by hardware circuitry and/or firmware stored, for example, in a non-volatile memory.

Some embodiments of the systems described herein may include a means for generating a preliminary blur map for a digital image, or a portion thereof. For example, a blur map estimation module may access data representing a digital image and generate a preliminary blur map for the digital image using any of all of the techniques described herein. The blur map estimation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform accessing data representing a digital image and generating a preliminary blur map for the digital image, as described herein. Other embodiments of the blur map estimation module may be at least partially implemented by hardware circuitry and/or firmware stored, for example, in a non-volatile memory.

Some embodiments of the systems described herein may include a means for generating a coherent blur map for a digital image, or a portion thereof. For example, in some embodiments, a blur map generation module may access a blur classification probability matrix for a digital image, may initialize blur state labels for all (or selected) pixels in a digital image, may formulate a labeling problem that attempts to minimize the cost of the labeling solution, and may solve the labeling problem (using an alpha expansion or another suitable method) to produce a coherent mapping of image pixels to blur state labels, as described herein. In other embodiments, the blur map generation module may access data representing a preliminary blur map for a digital image and may generate a coherent blur map dependent on the preliminary blur map, color information for the pixels of the digital image, and/or a smoothness prior for pixels of the digital image, as described herein. The blur map generation module may in some embodiments be implemented by a non-transitory, computer-readable storage medium and one or more processors (e.g., CPUs and/or GPUs) of a computing apparatus. In some embodiments, the computer-readable storage medium may store program instructions executable by the one or more processors to cause the computing apparatus to perform accessing a blur classification probability matrix, initializing blur state labels for all (or selected) pixels in a digital image, formulating a labeling problem that attempts to minimize the cost of the labeling solution, and/or solving the labeling problem (using an alpha expansion or another suitable method) to produce a coherent mapping of image pixels to blur state labels, as described herein. In other embodiments, the computer-readable storage medium may store program instructions executable by the one or more processors to cause the computing apparatus to perform accessing data representing a preliminary blur map for a digital image and generating a coherent blur map dependent on the preliminary blur map, color information for the pixels of the digital image, and/or a smoothness prior for pixels of the digital image, as described herein. Still other embodiments of the blur map generation module may be at least partially implemented by hardware circuitry and/or firmware stored, for example, in a non-volatile memory.

Some embodiments of the systems described herein may include a means for defining a binary segmentation of a digital image (or a portion thereof) into blurry and sharp regions. For example, in some embodiments, a binary segmentation module may access a blur classification probability matrix for a digital image, may pre-process some or all of the values in the blur classification probability matrix to remove any bias due to the blur kernel set size, may formulate a graph cut problem that attempts to minimize the cost of the binary segmentation solution, and may solve the graph cut problem to produce a binary segmentation of pixels in the digital image, as described herein. In other embodiments, a binary segmentation module may access a preliminary blur map generated for an input image (e.g., using the preliminary blur estimation techniques described herein), and may generate a binary segmentation of the input image based on that pre-processed information. The binary segmentation module may in some embodiments be implemented by a non-transitory, computer-readable storage medium and one or more processors (e.g., CPUs and/or GPUs) of a computing apparatus. In some embodiments, the computer-readable storage medium may store program instructions executable by the one or more processors to cause the computing apparatus to perform accessing a blur classification probability matrix for a digital image, pre-processing some or all of the values in the blur classification probability matrix to remove any bias due to the blur kernel set size, formulating a graph cut problem that attempts to minimize the cost of the binary segmentation solution, and/or solving the graph cut problem to produce a binary segmentation of pixels in the digital image, as described herein. In other embodiments, the computer-readable storage medium may store program instructions executable by the one or more processors to cause the computing apparatus to perform accessing a preliminary blur map generated for an input image (e.g., using the preliminary blur estimation techniques described herein), and generating a binary segmentation of the input image based on that pre-processed information. Still other embodiments of the binary segmentation module may be at least partially implemented by hardware circuitry and/or firmware stored, for example, in a non-volatile memory.

Some embodiments of the systems described herein may include a means for estimating the depth of one or more objects in a digital image dependent on a blur classification probability matrix, on a preliminary blur map, and/or on a coherent blur map for the digital image. For example, an image object depth estimation module may receive input identifying an object or portion of a digital image for which to estimate the depth, may access a blur classification probability matrix, a preliminary blur map, or coherent blur map for the digital image, and may estimate the depth of the identified object or portion of the digital image based (at least in part) on the values stored in the blur classification probability matrix, preliminary blur map, or coherent blur map and corresponding to the pixels making up the identified object or portion of the digital image, as described herein. The image object depth estimation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying an object or portion of a digital image for which to estimate the depth, accessing a blur classification probability matrix, preliminary blur map, or coherent blur map for the digital image, and/or estimating the depth of the identified object or portion of the digital image based (at least in part) on the values stored in the blur classification probability matrix, preliminary blur map, or coherent blur map and corresponding to the pixels making up the identified object or portion of the digital image, as described herein. Other embodiments of the image object depth estimation module may be at least partially implemented by hardware circuitry and/or firmware stored, for example, in a non-volatile memory.

As noted above, some embodiments of the systems described herein may include a means for receiving input usable to activate various tools to perform the computations and image editing operations described herein, and/or to select or enter parameter values to be used in those computations. For example, a user interface module may receive input representing the selection of a filter basis and/or various blur classification parameter values (e.g., the window size, the noise level, the pixel coherence or smoothness, the set of blur kernel radii, the edge contrast, the in-focus radius, or another parameter), and/or may receive input representing the invocation of various blur classification operations (e.g., generation of a preliminary blur map, generation of a coherent blur map, performance of a binary segmentation, depth estimation, or another image editing operation that employs the results of a blur classification and/or coherent blur map generation operation), as described herein. The user interface module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input representing the selection of a filter basis and/or various blur classification parameter values, and/or receiving input representing the invocation of various blur classification operations, as described herein. Other embodiments of the user interface module may be at least partially implemented by hardware circuitry and/or firmware stored, for example, in a non-volatile memory.

Example System

Embodiments of a blur classification module as described herein may be executed on one or more computer systems, which may interact with various other devices. FIG. 18 illustrates an example computer system that is configured to implement the blur classification techniques described herein, according to various embodiments. In different embodiments, computer system 1800 may be any of various types of devices, including, but not limited to, a personal computer system, desktop computer, laptop, notebook, tablet device, slate device, netbook computer, mainframe computer system, handheld computer, workstation, network computer, camera, set top box, mobile device, consumer device, video game console, handheld video game device, application server, storage device, peripheral device (such as a switch, modem, or router), or in general any type of computing or electronic device.

In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display device(s) 1880. In various embodiments, display device(s) 1880 may include one or more tablet or slate devices and/or other types of devices that include a display capability and serve as input and/or output devices. In some embodiments, it is contemplated that embodiments may be implemented using a single instance of computer system 1800, while in other embodiments multiple such systems, or multiple nodes making up computer system 1800, may be configured to host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

In some embodiments, at least one processor 1810 may be a graphics processing unit. A graphics processing unit or GPU may be considered a dedicated graphics-rendering device for a personal computer, tablet device, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein for blur classification, binary image segmentation, and/or image editing may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1820 may be configured to store program instructions and/or data accessible by processor 1810. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a blur classification module are shown stored within system memory 1820 as program instructions 1825 and data storage 1835, respectively. In other embodiments, program instructions and/or data may be received, sent or stored upon different types of computer-accessible media or on similar media separate from system memory 1820 or computer system 1800. Generally speaking, a computer-accessible medium may include non-transitory, computer-readable storage media or memory media such as magnetic or optical media (e.g., disk or CD/DVD-ROM), volatile or non-volatile media such as RAM (e.g. SDRAM, DDR, RDRAM, SRAM, etc.), ROM, etc., coupled to computer system 1800 via I/O interface 1830. In some embodiments, program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1840.

In one embodiment, I/O interface 1830 may be configured to coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. In addition, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network, such as other computer systems, or between nodes of computer system 1800. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, cursor control devices, voice or optical recognition devices, or any other devices suitable for entering or retrieving data by one or more computer system 1800. Multiple input/output devices 1850 may be present in computer system 1800 or may be distributed on various nodes of computer system 1800. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1825, configured to implement embodiments of a blur classification module as described herein, and data storage 1835, comprising various data accessible by program instructions 1825. In one embodiment, program instructions 1825 may include software elements of embodiments of a blur classification module as illustrated in the above figures. In this example, program instructions 1825 may include a blur classification module and/or various sub-modules thereof (e.g., a user interface module, an input image preprocessing module, an image window pre-processing module, a blur kernel pre-processing module, a blur classification probability matrix generation module, a blur map estimation module, a blur map generation module, a binary segmentation module, and/or an image object depth estimation module). In this example, data storage 1835 may include data that may be used by the various blur classification and/or image editing operations described herein (e.g., input image data, pre-processed image data, output image data, a blur classification probability matrix, data representing results of various image window and/or blur kernel pre-possessing operations, a binary mask representing an image segmentation, data representing a preliminary blur map, data representing a coherent blur mapping, data representing a depth estimation, various parameter values for the blur classification module, a three-dimensional (3D) matrix of probability data based on the results of a preliminary blur estimation, look-up tables storing spectrum values and/or derivatives thereof, or any other data input to, output from, or produced as intermediate data by the blur classification module described herein). In other embodiments, other or different software elements and/or data may be included in memory 1820.

Those skilled in the art will appreciate that computer system 1800 is merely illustrative and is not intended to limit the scope of a blur classification module as described herein. In particular, computer system 1800 and/or other devices that may be configured to perform the blur classification and/or image editing operations described herein may include any combination of hardware or software that can perform the indicated functions, including, but not limited to, a computer, personal computer system, desktop computer, laptop, notebook, tablet device, slate device, netbook computer, mainframe computer system, handheld computer, workstation, network computer, camera, set top box, mobile device, network device, internet appliance, PDA, wireless phone, pager, consumer device, video game console, handheld video game device, application server, storage device, peripheral device (such as a switch, modem, or router), or in general any type of computing or electronic device. Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components described herein may execute in memory on another device and communicate with the illustrated computer system via inter-computer communication. Some or all of the system components or data structures may also be stored (e.g., as instructions or structured data) on a non-transitory computer-accessible medium or a portable article to be read by an appropriate drive, various examples of which are described above. In some embodiments, instructions stored on a computer-accessible medium separate from computer system 1800 may be transmitted to computer system 1800 via transmission media or signals such as electrical, electromagnetic, or digital signals, conveyed via a communication medium such as a network and/or a wireless link. As previously noted, various embodiments may further include receiving, sending or storing instructions and/or data implemented in accordance with the foregoing description upon a computer-accessible medium. Accordingly, the techniques described herein may be practiced with other computer system configurations.

GLOSSARY

As used herein, the following definitions apply to the terms listed below.

Gaussian function: A Gaussian function is "bell shaped curve". It has a value of 1 at 0, and falls off gradually away from zero. The standard deviation, or "sigma", of a Gaussian function is the value at which the function has fallen to about 0.24 in the positive and negative directions. The formula for the Gaussian function with independent variable x and sigma σ is as follows:

$$\exp(-x^2/2\sigma^2)$$

A 2D Gaussian function is a radially symmetric version of a Gaussian function defined on the plane. The formula for a 2D Gaussian with independent variables x and y is as follows:

$$\exp(-(x^2+y_2)/(2\sigma^2))$$

Blur kernel: A blur kernel describes which pixels in the sharp image have been combined (e.g., averaged) to form a pixel in the blurred image. A blur kernel contains, for a set of offsets from a central pixel, a value representing the amount that the pixel offset by that amount in the sharp image contributes to the blur for the centrally located pixel. All of these "amounts" are normalized so that their sum is one in order to obtain a weighted average of sharp image pixels for the value of a blurred image pixel.

Normal Distribution:

The normal distribution is a probability distribution for a random variable X such that the probability that X takes on the value x is:

$$\exp(-x^2/(2\sigma^2))/(\sqrt{2\pi}\sigma)$$

Here, σ is the standard deviation of the distribution. The expression above represents the zero-mean form of the distribution (i.e., a distribution in which the average value is 0). This form is used in the examples described herein.

The various methods as illustrated in the figures and described herein represent example embodiments of methods for blur classification and other image editing operations. The methods may be implemented in software, hardware, or a combination thereof. In various embodiments, the order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:

using a computer to perform:

accessing data representing a digital image;

performing a preliminary blur map estimation for the digital image to produce a preliminary blur mapping, the performing the preliminary blur map estimation being dependent on a continuous, differentiable function for computing a probability that a given pixel of the digital image was blurred using a particular blur kernel, the preliminary blur mapping comprising, for each pixel of the digital image, two or more values each representing a probability that the pixel was blurred using a respective blur kernel, and the performing the preliminary blur map estimation comprising generating a look-up table that comprises a value of a blur spectrum for each of a plurality of values of radius r; and generating a coherent blur map labeling for the digital image dependent on the preliminary blur mapping, the generating the coherent blur map labeling comprising determining a most likely collection of mappings between pixels of the image and respective blur kernels, and the coherent blur map labeling comprising a single mapping between each pixel of the digital image and a respective one of a plurality of blur kernels.

2. The method of claim 1, wherein the performing the preliminary blur map estimation comprises determining a set of two or more local minima of a cost function at said each pixel dependent on image statistics in a local image window for the pixel.

3. The method of claim 2, wherein the generating the coherent blur map labeling comprises optimizing an energy function over the digital image, and wherein the energy function comprises a data term that is dependent on the set of two or more local minima.

4. The method of claim 1, wherein the plurality of blur kernels comprises a family of blur kernels defined in terms of a single parameter whose value is different for each member of the family.

5. The method of claim 4, wherein the plurality of blur kernels is modeled as a plurality of disc functions of the radius r, and wherein the performing the preliminary blur map estimation comprises modeling the blur spectrum as a differentiable function of the radius r for blur kernels having real-valued radii.

6. The method of claim 5, wherein the look-up table further comprises a value of a first derivative and a value of a second derivative of the differentiable function for each of the plurality of values of radius r.

7. The method of claim 1, wherein the generating the coherent blur map labeling comprises optimizing an energy function over the digital image, and wherein the energy function is dependent on color information for said each pixel of the digital image.

8. The method of claim 1, wherein the generating the coherent blur map labeling comprises optimizing an energy function over the digital image, and wherein the energy function comprises a smoothness term that is adaptive to local image content.

9. The method of claim 1, wherein the generating the coherent blur map labeling comprises optimizing an energy function over the digital image, and wherein the energy function comprises a confidence term that is dependent on differences between multiple independent preliminary blur mappings.

10. A system, comprising:

at least one processor; and a memory comprising program instructions, the program instructions being executable by the at least one processor to perform:

accessing data representing a digital image;

performing a preliminary blur map estimation for the digital image to produce a preliminary blur mapping, the performing the preliminary blur map estimation being dependent on a continuous, differentiable function for computing a probability that a given pixel of the digital image was blurred using a particular blur kernel, the preliminary blur mapping comprising, for each pixel of the digital image, two or more values each representing a probability that the pixel was blurred using a respective blur kernel, and the performing the preliminary blur map estimation comprising generating a look-up table that comprises a value of a blur spectrum for each of a plurality of values of radius r; and generating a coherent blur map labeling for the digital image dependent on the preliminary blur mapping, the generating the coherent blur map labeling comprising determining a most likely collection of mappings between pixels of the image and respective blur kernels, and the coherent blur map labeling comprising a single mapping between each pixel of the digital image and a respective one of a plurality of blur kernels.

11. The system of claim 10, wherein the performing the preliminary blur map estimation comprises determining a set of two or more local minima of a cost function at said each pixel dependent on image statistics in a local image window for the pixel, wherein the generating the coherent blur map labeling comprises optimizing an energy function over the digital image, and wherein the energy function comprises a data term that is dependent on the set of two or more local minima.

12. The system of claim 10, wherein the plurality of blur kernels is modeled as a plurality of disc functions of the radius r, and wherein the performing the preliminary blur map estimation comprises modeling the blur spectrum as a differentiable function of the radius r for blur kernels having real-valued radii.

13. The system of claim 10, wherein the generating the coherent blur map labeling comprises optimizing an energy function over the digital image, and wherein the energy function is dependent on one or more of: color information for said each pixel of the digital image, a smoothness term that is adaptive to local image content, or a confidence term that is dependent on differences between multiple independent preliminary blur mappings.

14. The system of claim 12, wherein the look-up table further comprises a value of a first derivative and a value of a second derivative of the differentiable function for each of the plurality of values of radius r.

15. A non-transitory, computer-readable storage medium storing program instructions that when executed on one or more computers cause the one or more computers to perform:

accessing data representing a digital image;

performing a preliminary blur map estimation for the digital image to produce a preliminary blur mapping, the performing the preliminary blur map estimation being dependent on a continuous, differentiable function for computing a probability that a given pixel of the digital image was blurred using a particular blur kernel, the preliminary blur mapping comprising, for each pixel of the digital image, two or more values each representing a probability that the pixel was blurred using a respective blur kernel, and the performing the preliminary blur map estimation comprising generating a look-up table that comprises a value of a blur spectrum for each of a plurality of values of radius r; and generating a coherent blur map labeling for the digital image dependent on the preliminary blur mapping, the generating the coherent blur map labeling comprising determining a most likely collection of mappings between pixels of the image and respective blur kernels, and the coherent blur map labeling comprising a single mapping between each pixel of the digital image and a respective one of a plurality of blur kernels.

16. The non-transitory, computer-readable storage medium of claim 15, wherein the plurality of blur kernels is modeled as a plurality of disc functions of the radius r, and wherein the performing the preliminary blur map estimation comprises modeling the blur spectrum as a differentiable function of the radius r for blur kernels having real-valued radii.

17. The non-transitory, computer-readable storage medium of claim 16, wherein the look-up table further comprises a value of a first derivative and a value of a second derivative of the differentiable function for each of the plurality of values of radius r.

18. The non-transitory, computer-readable storage medium of claim 15, wherein the performing the preliminary blur map estimation comprises determining a set of two or more local minima of a cost function at said each pixel dependent on image statistics in a local image window for the pixel, wherein the generating the coherent blur map labeling comprises optimizing an energy function over the digital image, and wherein the energy function comprises a data term that is dependent on the set of two or more local minima.

19. The non-transitory, computer-readable storage medium of claim 15, wherein the generating the coherent blur map labeling comprises optimizing an energy function over the digital image, and wherein the energy function is dependent on one or more of: color information for said each pixel of the digital image, a smoothness term that is adaptive to local image content, or a confidence term that is dependent on differences between multiple independent preliminary blur mappings.

* * * * *